US011171940B2

(12) United States Patent
Smith et al.

(10) Patent No.: US 11,171,940 B2
(45) Date of Patent: Nov. 9, 2021

(54) SECURE TYPE-ENFORCED ACTIONS

(71) Applicant: INTEL CORPORATION, Santa Clara, CA (US)

(72) Inventors: Ned M. Smith, Beaverton, OR (US); Gregory Burns, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 15/942,402

(22) Filed: Mar. 30, 2018

(65) Prior Publication Data

US 2019/0044939 A1 Feb. 7, 2019

(51) Int. Cl.

| | |
|---|---|
| ***H04L 29/06*** | (2006.01) |
| ***H04L 9/08*** | (2006.01) |
| ***G06F 21/53*** | (2013.01) |
| ***H04L 9/32*** | (2006.01) |
| ***H04L 29/08*** | (2006.01) |
| ***H04W 4/70*** | (2018.01) |
| ***G06F 21/60*** | (2013.01) |
| ***H04W 12/122*** | (2021.01) |
| *B25J 9/16* | (2006.01) |

(52) U.S. Cl.

CPC .......... *H04L 63/0807* (2013.01); *G06F 21/53* (2013.01); *G06F 21/602* (2013.01); *G06F 21/606* (2013.01); *H04L 9/08* (2013.01); *H04L 9/0833* (2013.01); *H04L 9/3213* (2013.01); *H04L 63/0428* (2013.01); *H04L 63/083* (2013.01); *H04L 63/1441* (2013.01); *H04L 67/12* (2013.01); *H04L 67/26* (2013.01); *H04W 4/70* (2018.02); *H04W 12/122* (2021.01); *B25J 9/163* (2013.01); *G06F 2221/2105* (2013.01); *H04L 2209/60* (2013.01)

(58) Field of Classification Search

CPC . G06F 21/606; G06F 21/602; H04L 2209/60; H04L 67/26

USPC .............................................................. 726/2

See application file for complete search history.

(56) References Cited

U.S. PATENT DOCUMENTS

| | | | | |
|---|---|---|---|---|
| 2005/0097317 A1* | 5/2005 | Trostle | H04L 9/0833 | 713/163 |
| 2010/0067695 A1* | 3/2010 | Liao | G06Q 10/06 | 380/255 |
| 2011/0252116 A1* | 10/2011 | Menoher | H04L 63/105 | 709/217 |
| 2014/0056124 A1* | 2/2014 | Yeow | H04W 40/246 | 370/221 |

(Continued)

FOREIGN PATENT DOCUMENTS

EP 3547651 10/2019

OTHER PUBLICATIONS

Dieber et al.: "Security for the Robot Operating System"Published in: Journal, Robotics and Autonomous Systems vol. 98, Issue C Dec. 2017, Amsterdam, The Netherlands 30 pages.

(Continued)

*Primary Examiner* — Teshome Hailu

(74) *Attorney, Agent, or Firm* — Schwegman Lundberg & Woessner, P.A.

(57) ABSTRACT

In some examples, a robot middleware system including a first robot middleware node, a second robot middleware node, and one or more secure encrypted type-enforced context message between the first robot middleware node and the second robot middleware node.

34 Claims, 17 Drawing Sheets

(56) References Cited

U.S. PATENT DOCUMENTS

| | | | | |
|---|---|---|---|---|
| 2016/0036611 | A1 | 2/2016 | Ma et al. | |
| 2016/0366111 | A1 | 12/2016 | Smith et al. | |
| 2017/0093879 | A1 * | 3/2017 | Dayka | H04L 63/0471 |
| 2018/0324104 | A1 * | 11/2018 | Carey | H04L 47/36 |

OTHER PUBLICATIONS

Pallickara et al,.:"A Framework for Secure End-to-End Delivery of Messages in Publish/Subscribe Systems" Published in: 2006 7th IEEE/ACM International Conference on Grid Computing, Sep. 2006, Barcelona, Spain, 8 pages.
European Search Report for related EP Application Serial No. EP19 16 0062 with a completion date of Aug. 2, 2019, 7 pages.
"European Application Serial No. 19160062.6, Communication Pursuant to Article 94(3) EPC dated Jul. 17, 2020", 6 pgs.
"European Application Serial No. 19160062.6, Response filed Mar. 31, 2020 to Extended European Search Report dated Aug. 9, 2019", 20 pgs.
"European Application Serial No. 19160062.6, Response filed Nov. 23, 2020 to Communication Pursuant to Article 94(3) EPC dated Jul. 17, 2020", 16 pgs.

* cited by examiner

200

400

500

600

700

900

1000

1100

1300

1400

SECURE TYPE-ENFORCED ACTIONS

TECHNICAL FIELD

The present techniques may relate generally to secure type-enforced actions. Present techniques may relate to secure type-enforced actions for robots, autonomous vehicles, and/or distributed systems. The present techniques also may relate generally to distributed notifications. Present techniques may relate to distributed notifications for robots, autonomous vehicles, and/or distributed systems.

BACKGROUND

Robot Operating System (ROS) and other middleware implementations can be used to define middleware for autonomous vehicles, robots, and distributed systems, for example. These types of applications that misbehave can have serious consequences, particularly in certain implementations (for example, when used in autonomous vehicles). Malicious attacks could intercept, inject and replace messages that could enable a rogue client or server to be introduced. Also, non-malicious environmental conditions could cause messages to be unacceptably delayed or lost. Further, programming errors could result in unsafe message exchanges between nodes.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
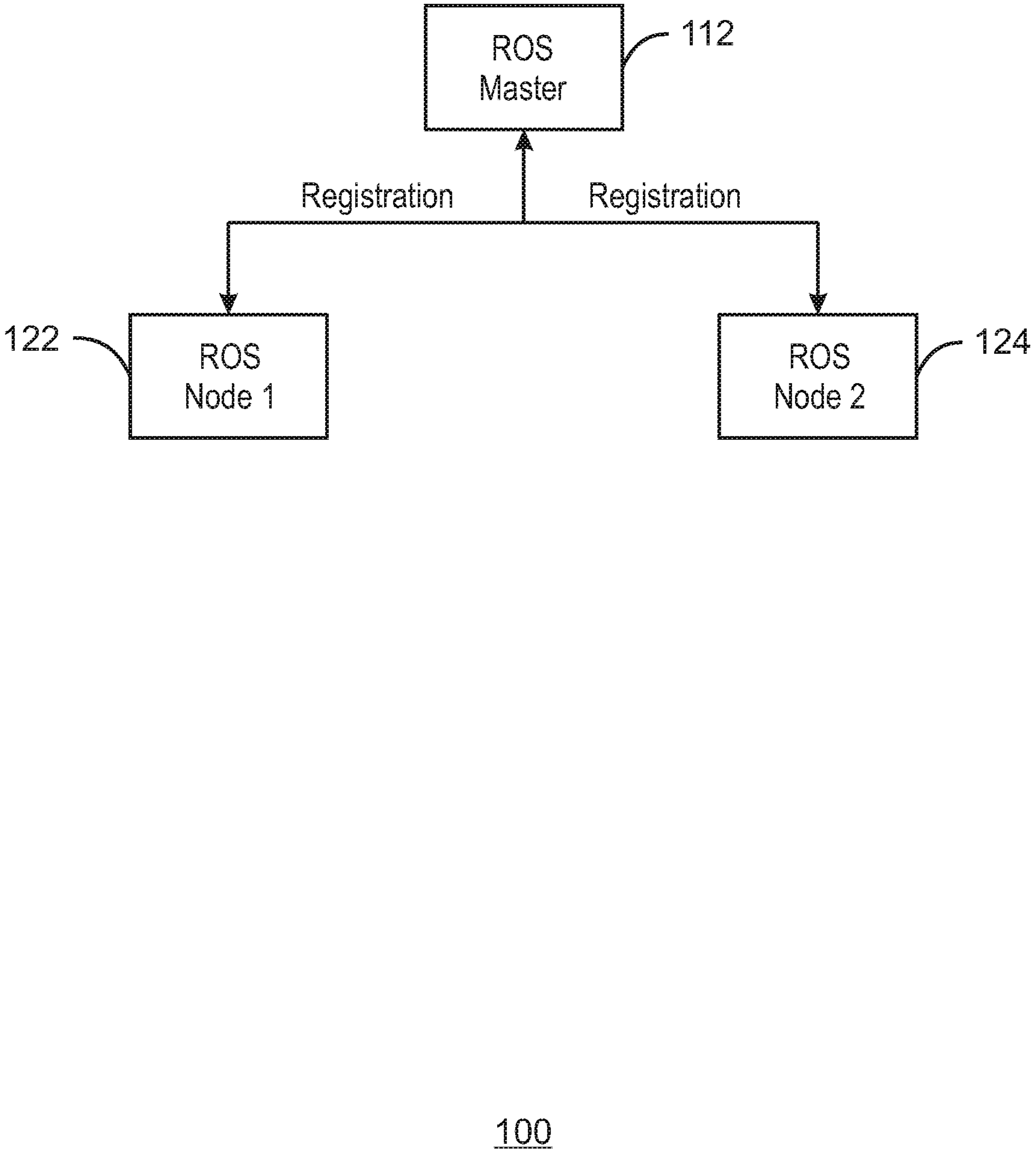
FIG. 1 illustrates a robot system in accordance with some embodiments.

In some embodiments, secure type-enforced actions are implemented. For example, in some embodiments, secure type-enforced actions for robots, autonomous vehicles, and/or distributed systems are implemented. Some embodiments relate to secure type-enforced actions in a robot operating system (and/or in a robot middleware interaction system).

In some embodiments, distributed notifications are implemented. For example, in some embodiments, distributed notifications for robots, autonomous vehicles, and/or distributed systems are implemented. Some embodiments relate to distributed notifications in a robot operating system (and/or in a robot middleware interaction system).

The robot operating system (Robot OS or ROS) and ROS2 define middleware for autonomous vehicles, robots and distributed systems (for example, used for robot software development). ROS may provide services designed for heterogeneous computer cluster such as hardware abstraction, device control, implementation of commonly used functionality, message-passing between processes, and package management, among others. ROS-based processing may be implemented in nodes that may receive, post, and multiplex sensor, control, state, planning, actuator and other messages. Despite the importance of reactivity and low latency in robot control, ROS itself is not a real-time OS (RTOS), but it is possible to integrate ROS with real-time code. ROS is a flexible framework for writing robot software, and is a collection of tools, libraries, and conventions that aim to simplify the task of creating complex and robust robot behavior across a wide variety of platforms. ROS can include a communication system to allow robotic functionality such as, for example, including nodes such as sensors, actuators, and applications, for example, to easily provide smooth communication and functionality, even when the various functionality is being provided by different vendors.

ROS nodes may be processes that perform computation (for example, perform some piece of autonomous and/or robotic related functionality). A ROS system may be designed to be modular and include many nodes. For example, in some embodiments, a ROS node can be thought of as a software module, and means for implementing a ROS node can include a software module. In some embodiments, nodes communicate with each other by means of passing messages, which can be strictly limited data structures. Messages can be composed of other messages, and arrays of other messages, nested arbitrarily deep. A node can send a message by publishing it to a given topic (for example, which can be a string). A node that is interested in a certain type of data can subscribe to the appropriate topic accordingly. In some embodiments, multiple concurrent publishers and subscribers may exist for a single topic, and a single node may publish and/or subscribe to multiple topics. In some embodiments, publishers and subscribers need not be aware of the existence of each other.

As described herein, a ROS system may include a number of independent nodes that each communicate with other nodes in the system using means of a publish/subscribe messaging model. For example, a sensor's driver might be implemented as a node that publishes sensor data in a stream of messages. These messages could be consumed by any number of other nodes, including, for example, filters, loggers, and/or higher level systems such as guidance, pathfinding, etc. Nodes in a ROS system do not need to be on the same system and could include multiple computing devices. Additionally, nodes in a ROS system do not even need to be of the same architecture. For example, an Arduino system could publish messages, a PC laptop could subscribe to those published messages, and an Android phone could drive motors of the system. In this manner, a ROS system is very flexible and adaptable to the needs of a user.

As described herein, Robot OS (ROS) and ROS2 (Robot OS2) define middleware for autonomous vehicles, robots and distributed systems, for example. In some embodiments, nodes (such as, for example, ROS nodes) are distributed and may have highly cohesive interaction semantics. The semantics or interaction can be specified by an interface definition file that feeds a code generator able to output a source code implementation of a client and server side implementation of an interaction model, referred to as an 'action', for example. When a client-side node sends a 'goal' message to a server-side node, the 'goal' message can be processed according to an interface definition (for example, according to an interface definition that was provided at build time).

Applications that misbehave (for example, ROS applications that misbehave) can have serious consequences (for example, especially when used in autonomous vehicles). Malicious attacks could intercept, inject and replace messages, enabling a rogue client or server to be introduced. Further, non-malicious environmental conditions can cause message to be delayed (for example, unacceptably delayed) or lost. Additionally, programming errors could result in unsafe message exchanges between nodes (for example, despite best efforts to generate correct code). Therefore, in some embodiments, security, integrity, and safety issues can be addressed by integrating one or more action client and one or more action server with type-enforcement verification, and/or by applying integrity and/or confidentiality message protection.

FIGS. 1-6 illustrate example Robot OS (ROS) systems in which some embodiments may be implemented. The systems in FIG. 1-6 are not intended to be exhaustive examples of systems in which embodiments are implemented, but are just examples of some of the possible systems in which embodiments may be implemented. Although FIGS. 1-6 illustrate ROS systems, in some embodiments the systems of any or all of FIGS. 1-6 may be systems that are not ROS systems. For example, in some embodiments, systems of any or all of FIGS. 1-6 may be any system relating to autonomous vehicles, robots, and/or distributed systems. In some embodiments, systems of any or all of FIGS. 1-6 may be any computing system.

FIG. 1 illustrates a system 100 in accordance with some embodiments. System 100 may be a robot operating system (Robot OS system or ROS system). System 100 includes a master (for example, a ROS master) 112, a first node (for example, ROS node 1) 122, and a second node (for example, a ROS node 2) 124. Master 112 can manage communication between nodes 122 and 124. Each node 122 and 124 may register at startup with master 112. Nodes 122 and 124 may be pieces of software such as single-purpose, executable programs. These pieces of software can be individually compiled, executed, and managed, and can be organized in packages. The master 112 can allow all nodes 122 and 124 to find and talk to each other. In this manner, instructions do not need to be as specific to state something along the lines of "Send this sensor data to that computer at address X", but can simply instruct node 122 to send messages to node 124, for example.

Figure 2:
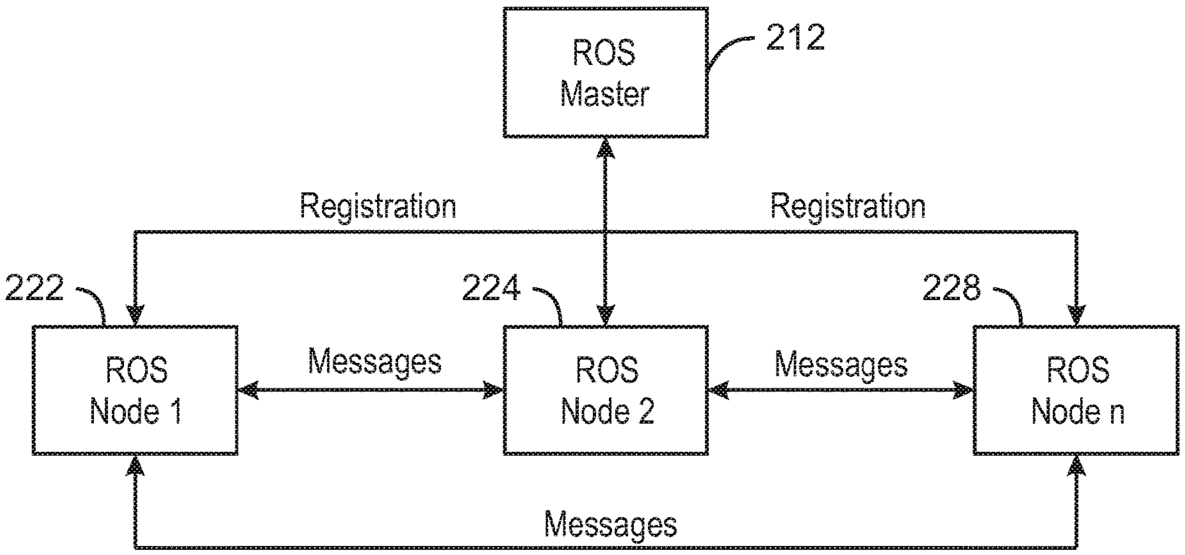
FIG. 2 illustrates a robot system in accordance with some embodiments.

FIG. 2 illustrates a system 200 in accordance with some embodiments. System 200 may be a robot operating system (Robot OS system or ROS system). System 200 includes a master (for example, a ROS master) 212, a first node (for example, ROS node 1) 222, a second node (for example, a ROS node 2) 224, and a third node (for example, a ROS node n) 228. Although FIG. 2 illustrates three nodes 222, 224, and 228, it is noted that any number of additional nodes may be included in some embodiments. Master 212 can manage communication between nodes 222, 224, and 228. Each node 222, 224, and 228 may register at startup with master 212. Nodes 222, 224, and 228 can be pieces of software such as single-purpose, executable programs. These pieces of software may be individually compiled, executed, and managed, and may be organized in packages. The master 212 may allow all nodes to find and talk to each other. In this manner, instructions do not need to be as specific to state something along the lines of "Send this sensor data to that computer at address X", but can simply instruct node 222 to send messages to node 228, for example. In some embodiments, nodes 222, 224 and 228 can be communicatively connected via wired or wireless connections. In some embodiments, communication pathways between nodes 222, 224 and 228 can be used to send messages.

Figure 3:
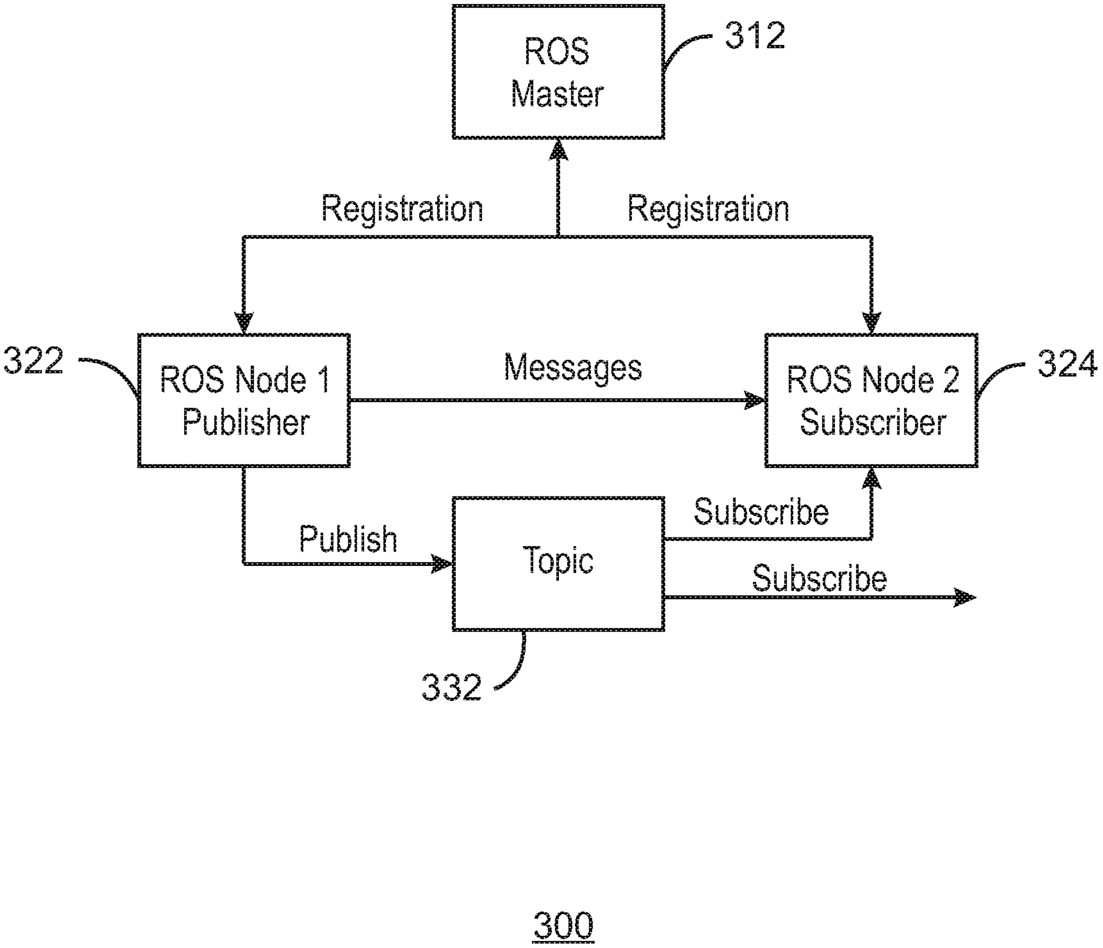
FIG. 3 illustrates a robot system in accordance with some embodiments.

FIG. 3 illustrates a system 300 in accordance with some embodiments. System 300 may be a robot operating system (Robot OS system or ROS system). System 300 includes a master (for example, a ROS master) 312, a first node (for example, ROS node 1) 322, and a second node (for example, a ROS node 2) 324. In some embodiments, node 322 can be a publisher node and node 324 can be a subscriber node. Master 312 can manage communication between nodes 322 and 324. Each node 322 and 324 may register at startup with master 312. Nodes 322 and 324 can be pieces of software such as single-purpose, executable programs. These pieces of software can be individually compiled, executed, and managed, and can be organized in packages. In some embodiments, nodes 322 and 324 can be communicatively connected via wired or wireless connections. In some embodiments, communication pathways between nodes 322 and 324 can be used to send messages.

The master 312 can allow all nodes 322 and 324 to find and talk to each other. In this manner, instructions do not need to be as specific to state something along the lines of "Send this sensor data to that computer at address X", but can simply instruct node 322 to send messages to node 324, for example. In some embodiments, messages can include a data structure defining the type of a topic. Messages can be included in a nested structure of integers, floats, booleans, strings, and/or arrays of objects, for example. In some embodiments, nodes 322 and 324 communicate over one or more topics such as topic 332. Topic 332 can be, for example, a stream of messages. Each of the nodes in the system can publish or subscribe to a particular topic such as topic 332. In some embodiments, system 300 includes one publisher (node 322) and a number of subscribers (for example, in some embodiments subscriber node 324, and in some embodiments subscriber 324 as well as one or more additional subscribers that are not illustrated in FIG. 3).

Figure 4:
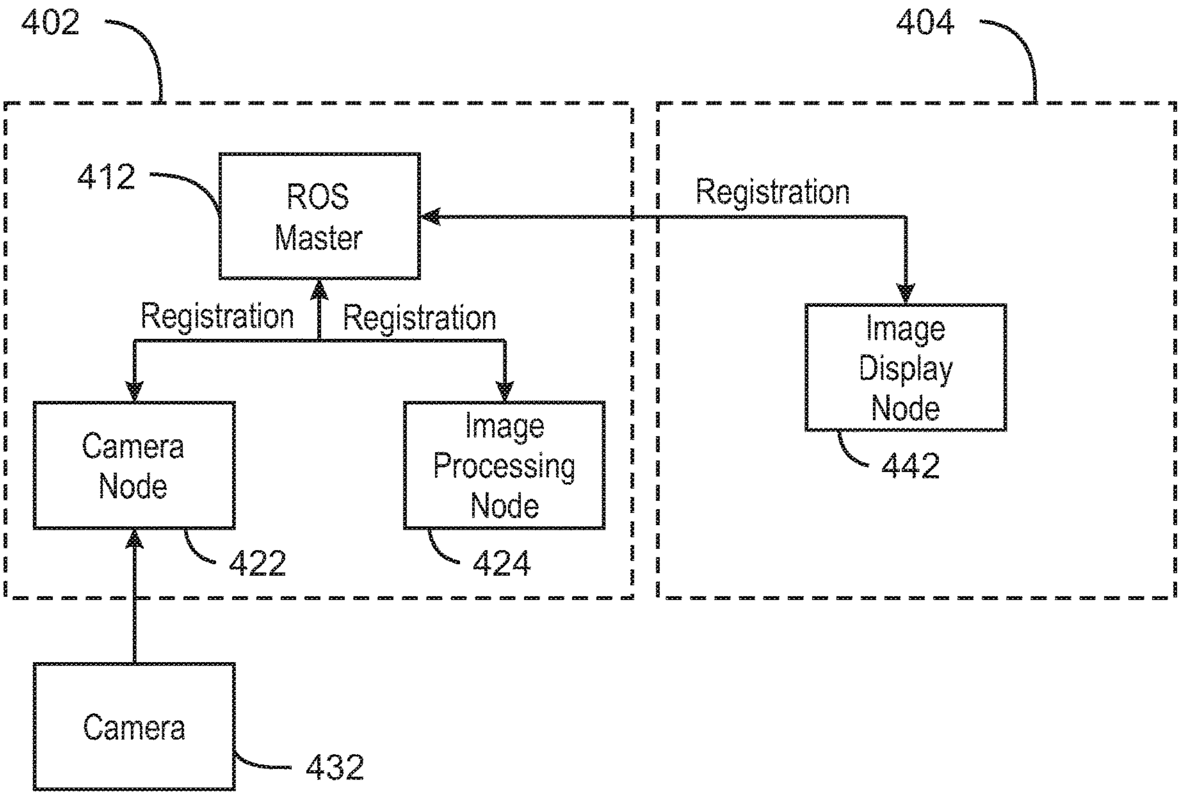
FIG. 4 illustrates a robot system in accordance with some embodiments.

FIG. 4 illustrates a system 400 in accordance with some embodiments. System 400 includes a first computing device shown within dotted line 402 in FIG. 4 and a second computing device shown within dotted line 404 in FIG. 4. In some embodiments, for example, computing device 402 can be a robot or a computing device included on a robot, and computing device 404 can be a remote computing device (for example, a laptop computer). In some embodiments, first computing device 402 includes a master (for example, a ROS master) 412, a first node 422 (for example, a camera node), and a second node 424 (for example, an image processing node). In some embodiments, system 400 includes a camera 432 (for example, camera 432 can be a camera on the robot). In some embodiments, computing device 404 includes a node 442 (for example, an image display node) that is in communication with master 412. For example, in some embodiments, master 412 and node 442 are coupled via a wired or a wireless communication link. Master 412 can manage communication between nodes 422, 424 and 442. Each node 422, 424 and 442 may register (for example, at startup) with master 412. Nodes 422, 424, and 442 can each be pieces of software such as single-purpose, executable programs. These pieces of software can be individually compiled, executed, and managed, and can be organized in packages. The master 412 can allow all nodes 422, 424, and 442 to find and talk to each other. In this manner, instructions do not need to be as specific to state something along the lines of "Send this sensor data to that computer at address X", but can simply instruct node 422 to send messages to node 424 and/or to node 442, for example. In some embodiments, messages can include a data structure defining the type of a topic. Messages can be included in a nested structure of integers, floats, booleans, strings, and/or arrays of objects, for example. In some embodiments, nodes 422, 424 and 442 can communicate over one or more topics (for example, one or more stream of messages). Each of the nodes in the system can publish or subscribe to a particular topic. In some embodiments, system 400 includes one publisher (for example, node 422) and a number of subscribers (for example, in some embodiments, nodes 424 and 442).

In some embodiments, camera 432 and computing device 402 are included on a robot. Images from camera 432 may be seen on both the robot itself (for example, via node 424) and on another computing device (for example, via node 442). In some embodiments, camera node 422 can implement communication with camera 432, image processing node 424 can process image data on the robot, and image display node 442 can display images on a screen of computing device 404.

Figure 5:
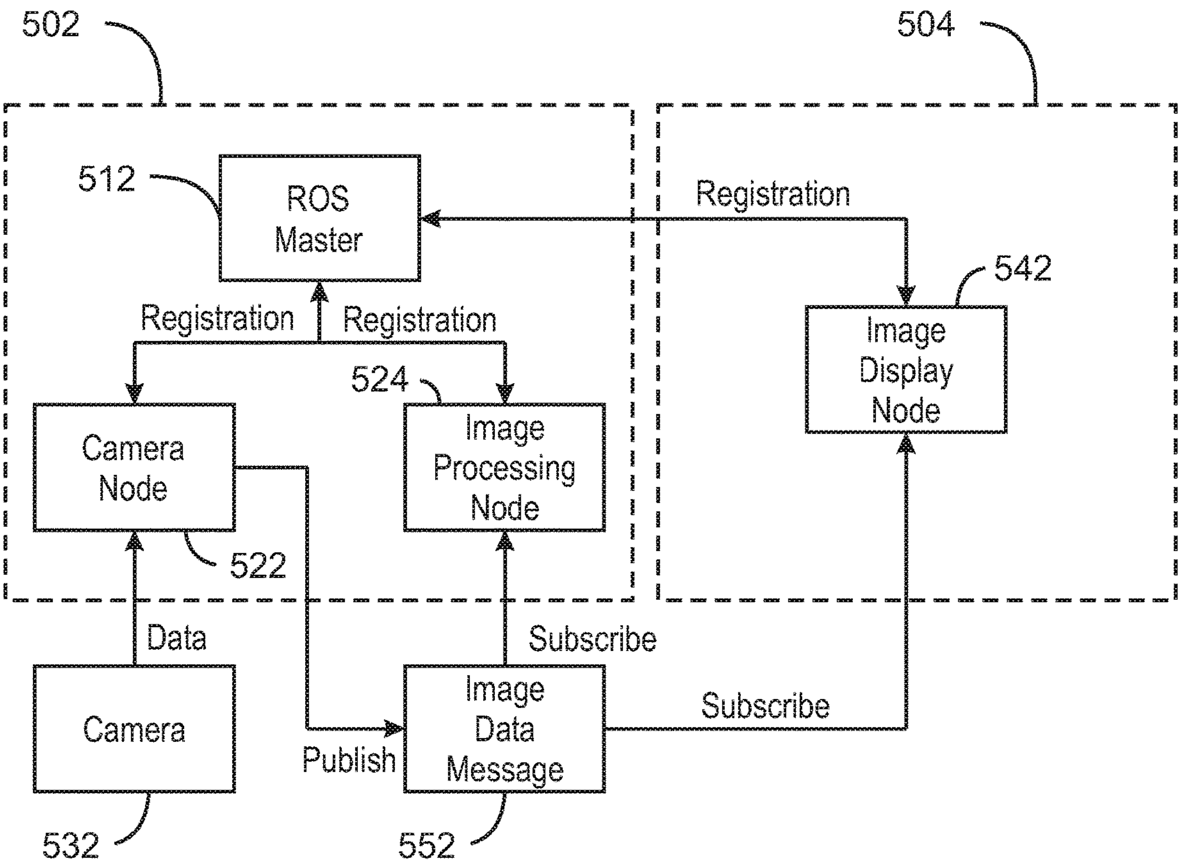
FIG. 5 illustrates a robot system in accordance with some embodiments.

FIG. 5 illustrates a system 500 in accordance with some embodiments. System 500 includes a first computing device shown within dotted line 502 in FIG. 5 and a second computing device shown within dotted line 504 in FIG. 5. In some embodiments, for example, computing device 502 may be a robot or a computing device included on a robot, and computing device 504 may be a remote computing device (for example, a laptop computer). In some embodiments, first computing device 502 includes a master (for example, a ROS master) 512, a first node 522 (for example, a camera node), and a second node 524 (for example, an image processing node). In some embodiments, system 500 includes a camera 532 (for example, camera 532 can be a camera on the robot). In some embodiments, computing device 504 includes a node 542 (for example, an image display node) that is in communication with master 512. For example, in some embodiments, master 512 and node 542 are coupled via a wired or a wireless communication link. Master 512 can manage communication between nodes 522, 524 and 542. Each node 522, 524 and 542 may register (for example, at startup) with master 512. Nodes 522, 524, and 542 can each be pieces of software such as single-purpose, executable programs. These pieces of software can be individually compiled, executed, and managed, and can be organized in packages. The master 512 can allow all nodes 522, 524, and 542 to find and talk to each other. In this manner, instructions do not need to be as specific to state something along the lines of "Send this sensor data to that computer at address X", but can simply instruct node 522 to send messages to node 524 and/or to node 542, for example. In some embodiments, messages can include a data structure defining the type of a topic. Messages can be included in a nested structure of integers, floats, booleans, strings, and/or arrays of objects, for example. In some embodiments, nodes 522, 524 and 542 can communicate over one or more topics (for example, one or more stream of messages). Each of the nodes in the system can publish or subscribe to a particular topic. In some embodiments, system 500 includes one publisher (for example, node 522) and a number of subscribers (for example, in some embodiments, nodes 524 and 542). In some embodiments, nodes 522 and 524, and nodes 522 and 542 can be communicatively connected via wired or wireless connections. In some embodiments, communication pathways between nodes 522 and 524, and nodes 522 and 542, can be used to send messages.

In some embodiments, camera 532 and computing device 502 are included on a robot. Images from camera 532 can be seen on both the robot itself (for example, via node 524) and on another computing device (for example, via node 542). In some embodiments, camera node 522 can implement communication with camera 532, image processing node 524 can process image data on the robot, and image display node 542 can display images on a screen of computing device 504.

In registering with master 512, the camera node 522 can state that it will publish a topic 552 (for example, a topic 522 such as an image data message). Similarly, both nodes 524 and 542 can register with the master 512 that they are subscribing to topic 552. In this manner, once the camera node 522 receives some data from the camera 532, camera node 522 sends the topic 552 directly to the other two nodes using publish and subscribe messaging. Similarly, one or more of the nodes (for example, one or more of nodes 524 and 542) can request data from node 522 at a specific time. This can be implemented using a services system. For example, a node can register a specific service with the master 512 in a manner similar to how it registers messages with the master 512. For example, in some embodiments, either image processing node 524, or image display node 542, or both nodes 524 and 542, can request data such as image data, for example, and node 522 gathers data from camera 532 and sends a reply.

Figure 6:
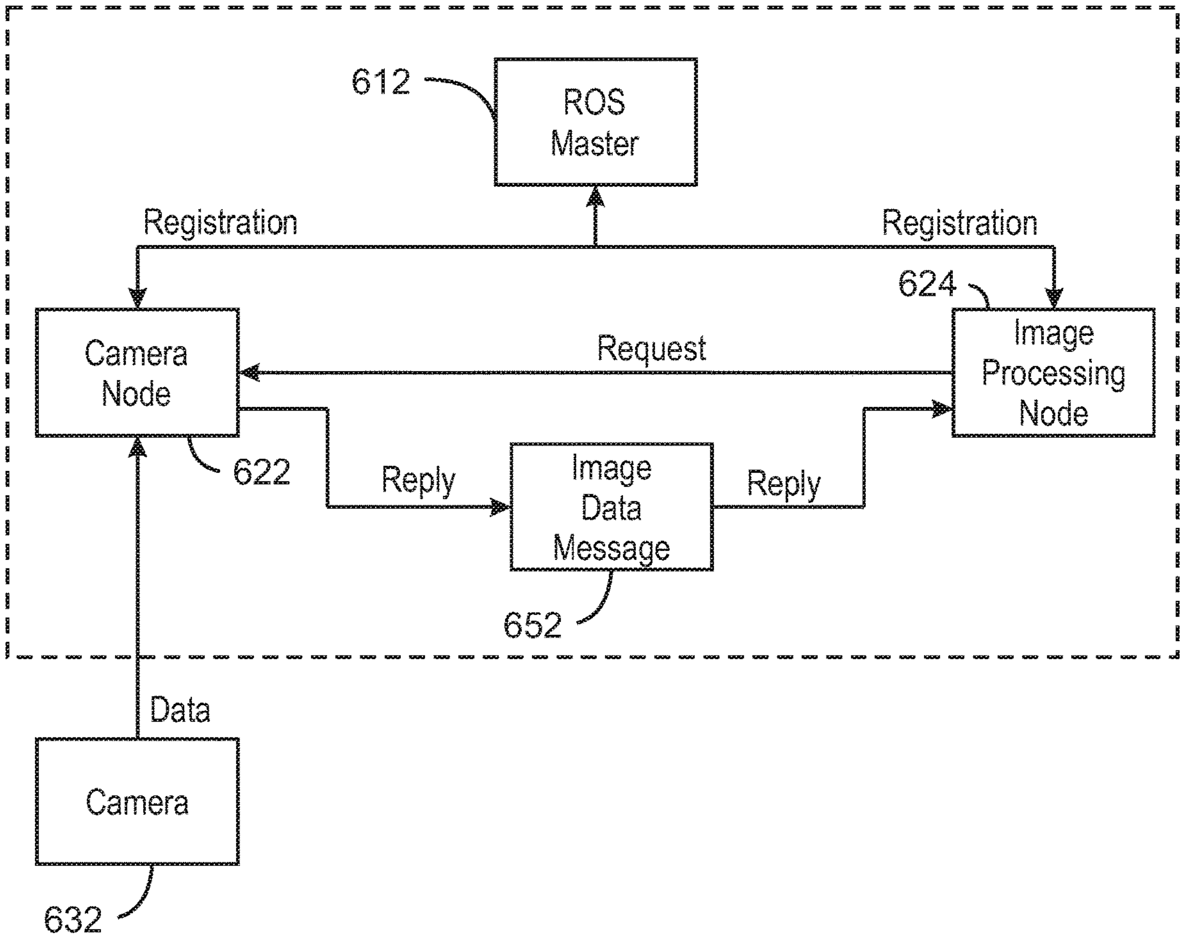
FIG. 6 illustrates a robot system in accordance with some embodiments.

FIG. 6 illustrates a system 600 in accordance with some embodiments. System 600 includes a computing device shown within dotted line 602 in FIG. 6. In some embodiments, for example, computing device 602 can be a robot or a computing device included on a robot. In some embodiments, computing device 602 includes a master (for example, a ROS master) 612, a first node 622 (for example, a camera node), and a second node 624 (for example, an image processing node). In some embodiments, system 600 includes a camera 632 (for example, camera 632 can be a camera on the robot). Master 612 can manage communication between nodes 622 and 624. Each node 622 and 624 may register (for example, at startup) with master 612. Nodes 622 and 624 can each be pieces of software such as single-purpose, executable programs. These pieces of software can be individually compiled, executed, and managed, and can be organized in packages. The master 612 can allow nodes 622 and 624 to find and talk to each other. In this manner, instructions do not need to be as specific to state something along the lines of "Send this sensor data to that computer at address X", but can simply instruct node 622 to send messages to node 624, for example. In some embodiments, messages can include a data structure defining the type of a topic. Messages can be included in a nested structure of integers, floats, booleans, strings, and/or arrays of objects, for example. In some embodiments, nodes 622 and 624 can communicate over one or more topics (for example, one or more stream of messages). Each of the nodes in the system can publish or subscribe to a particular topic. In some embodiments, system 600 includes one publisher (for example, node 622) and one or more subscribers (for example, in some embodiments, node 624 and in some embodiments, node 624 and other nodes).

In some embodiments, camera 632 and computing device 602 are included on a robot. In some embodiments, camera node 622 can implement communication with camera 632, and image processing node 624 can process image data on the robot.

In registering with master 612, the camera node 622 can state that it will publish a topic (for example, such as an image data message). Similarly, node 624 can register with the master 612 that it is subscribing to the topic. In this manner, once the camera node 622 receives some data from the camera 632, camera node 622 sends the topic directly to node 624 using publish and subscribe messaging. Similarly, node 624 can request data (for example, can request image data) from node 622 at a specific time, as illustrated by the Request arrow in FIG. 6. This can be implemented using a services system. For example, a node can register a specific service with the master 612 in a manner similar to how it registers messages with the master 612. For example, in some embodiments, image processing node 624 can request data such as image data, for example, and node 622 gathers data from camera 632 and sends a reply with image data message 652 to node 624. In some embodiments, nodes 622 and 624 can be communicatively connected via wired or wireless connections. In some embodiments, communication pathways between nodes 622 and 624 can be used to send messages.

As discussed above, ROS applications that misbehave can have serious consequences. Architecture used with systems such as robot systems can be flexible as far as the types of communication paths that exist, both within a robot, between robots, between robots and telemetry and other systems providing input to the robot, for example. These communications paths can introduce potential security issues, for example, with wireless communication paths or other communication paths such as wired communication paths. Some embodiments address security, integrity, and safety issues. One way to address security issues is to rely on physical isolation of the autonomous vehicle, robot, or system. However, wired or wireless communication technologies may not allow message traffic to be easily held within the physical confines of the autonomous vehicle, robot, or system structure. In public deployment environments, for example, a significant potential exists for rogue devices to be within communication range of non-rogue devices. For example, in the case of autonomous vehicles, rogue autonomous vehicles can be in communication range of non-rogue autonomous vehicles in public locations. Further, in some situations, different developers of autonomous vehicles can introduce programming errors into action models used to generate action clients and action servers so that an intended semantic impedance match is no longer extant at a time of deployment.

In some embodiments, nodes may include sensors, controllers, and actuators. In some embodiments, encrypted and access protected swimlanes (for example, communication pathway swimlanes or communication connection swimlanes) to provide content context (for example, by means of type-enforcement) may be created between various components in the system (for example, between nodes such as sensors and controllers, or between nodes such as controllers and actuators, etc.) In some embodiments, things of similar type are allowed to communicate with each other. In some embodiments, for example, a swimlane violation (or type-enforcement violation) may be identified if a sensor attempts to directly communicate with an actuator if that violates an expectation set up by the architecture (for example, the swimlane architecture). Similarly, in some embodiments, if the architecture requires communication through a particular controller, an attempt for a sensor to communicate directly with the actuator without going through the controller could be an indication that malware has established an unexpected control capability. In some embodiments, the swimlanes (for example, communication pathway swimlanes or communication connection swimlanes) are cryptographically defined with access control based on an expectation that the architecture provides (for example, how the various nodes are wired, or how the various nodes are communicatively connected, whether via wired or wireless connections). The architecture defined by the swimlanes informs expected access paths using means of cryptography, for example. In some embodiments, swimlane security can be provided by means of a key manager and/or a fluffy server used to help provide the swimlane security.

Figure 7:
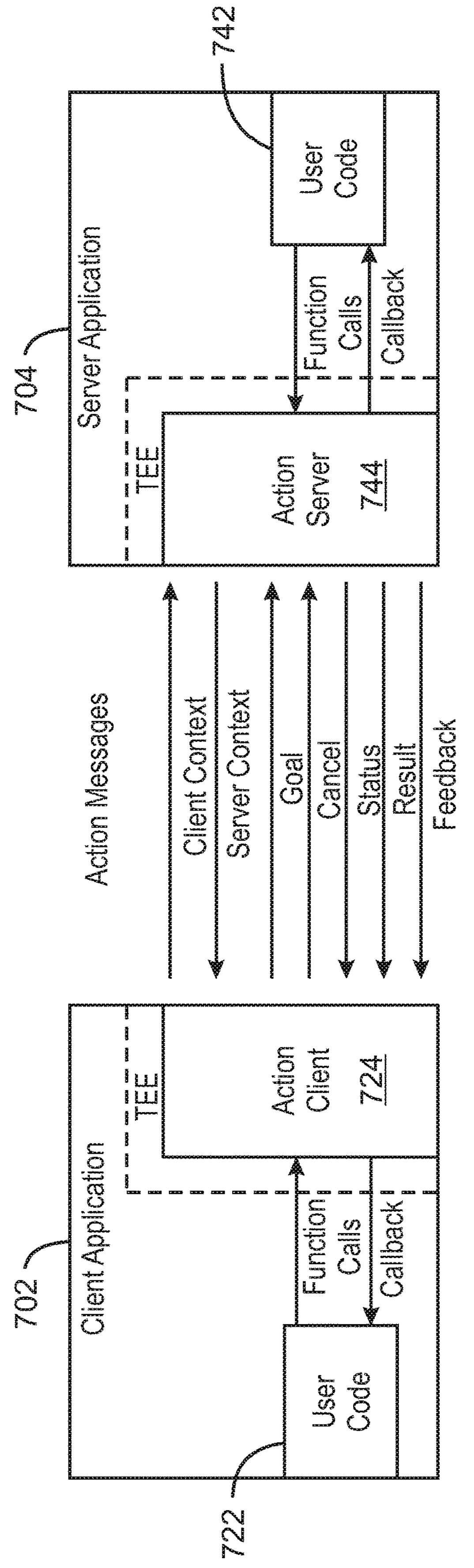
FIG. 7 illustrates a system in accordance with some embodiments.

FIG. 7 illustrates a system 700 (for example, a robot system) in accordance with some embodiments. System 700 can include an action interaction model in a robot system such as a robot operating system (for example, ROS or ROS2). System 700 uses an action interaction model with action messages that can help nodes in a system (for example, nodes in a robot system) to interact autonomously. In some embodiments, system 700 can be implemented using means of a publish/subscribe system (for example, publish/subscribe between nodes).

System 700 can include a client application 702 (for example, a client side application) and a server application 704 (for example, a server side application). In some embodiments, client application 702 and server application 704 can be communicatively connected via wired or wireless connections. In some embodiments, communication pathways between client application 702 and server application 704 can be used to send messages. In some embodiments, client application 702 can be included in (or run by) any of the nodes illustrated and/or described herein (for example, any of the nodes in FIGS. 1-6), and/or in some embodiments, server application 704 can be included in (or run by) any of the nodes illustrated and/or described herein (for example, any of the nodes in FIGS. 1-6). In some embodiments, for example, client application 702 and server application 704 can be included within one robot. In some embodiments, client application 702 can be included in one robot and server application 704 can be included within another device (for example, within a different robot). In some embodiments, server application 704 can be included in one robot and client application 702 can be included within another device. For example, in some embodiments, client application 702 can be included in any of the nodes described herein that uses a service from any of the other nodes described herein, where the server application 704 is included in the other node. It is also noted, that a particular node may be included server application 704 and provide a service to another node that includes client application 702, and that particular node may also include another client application 702 that receives a service from a different node. For example, in some embodiments, a particular node may include one or more client applications such as client application 702, and/or may include one or more server applications such as server application 704. Server application 704 can be included in any node offering up a data service, and client application 702 can be included in any node consuming a data service.

In some embodiments, client application 702 includes user code 722 and action client 724. User code 722 can send function calls to action client 724, and action client 724 can send a callback to user code 722. In some embodiments, server application 704 includes user code 742 and action server 744. User code 742 can send function calls to action client 744, and action client 744 can send a callback to user code 742. In some embodiments, action client 724 and/or action server 744 can be included in one or more Trusted Execution Environment (TEE) as illustrated by dotted lines within client application 702 and/or within server application 704. Examples of a Trusted Execution Environment (TEE) according to some embodiments can include means such as Intel® Software Guard Extensions (Intel® SGX), Intel® Converged Security Engine/Converged Security and Manageability Engine (Intel® CSE/SCME), Intel® Virtualization Technology (for example, Intel® VT-x), Intel® Trusted Execution Technology (Intel® TXT), ARM® TrustZone®, or some other trusted execution environment.

In some embodiments, system 700 can include an action interaction model. Client application 702 and server application 704 can exchange action messages that to help accomplish one or more goals, and may result in a response such as Status, Result, and/or Feedback responses. Client application 702 can send, for example, Goal and/or Cancel action messages and server application 704 can send Status, Result, and/or Feedback action messages. In some embodiments, the goal message is an indication from the client application 702 to the server application 704 as to what action is to be accomplished. The server application 704 then independently tries to satisfy the goal. The server application 704 can have, for example, possible status responses to the client application 702, such as Cancel (the goal is being cancelled), Status (the status of the goal), and Feedback (feedback based on the consequence of the goal that was given).

In some embodiments, this exchange of action messages can be augmented to include a pre-requisite interaction including a client context (ClientContext) action message sent from the client application 702 to the server application 704. Additionally, an optional server context message (ServerContext) action message can be sent from the server application 704 to the client application 702. The client context and the server context action messages can be used to ensure that interactions between the client application 702 and the server application 704 can be implemented according to a swimlane policy (for example, according to a type-enforced policy). The client context (ClientContext) action message can specify a security context in which subsequent action interactions should take place. It can also specify that an endpoint of an action interaction should be defined by a Trusted Execution Environment (TEE) such as Intel® SGX, Intel® CSE/CSME, Intel® VT-x, Intel® TXT, ARM® TrustZone®, or some other TEE.

The context action messages (ClientContext and/or ServerContext) can also specify how subsequent action messages are protected from malicious or accidental attack through use of swimlane technology. Swimlanes (for example, communication pathway swimlanes or communication connection swimlanes) may be constructed from a variety of techniques that harden the message path between the client application 702 and the server application 704, for example. Since node interactions may occur in intra-process, inter-process, and inter-device contexts, the swimlane hardening technique may differ depending on the context of the node interaction. For example, in some embodiments, an intra-process swimlane may include a memory buffer exchange where the buffer has read and write controls that are specific to process threads. In some embodiments, an inter-process swimlane may include a shared memory inter-process communication (IPC) where a shared memory region is isolated to an action client (for example, action client 724) and an action server (for example, action server 744). In some embodiments, an inter-node swimlane may include a network protocol and stack. In some embodiments, all swimlanes may be further protected using cryptography and TEE endpoints.

It is noted that other interactions besides actions can be anticipated by a robot operating system and can be used in accordance with some embodiments. For example, one or more of simple RESTful message exchange (as per Internet Engineering Task Force), stable message exchange, topic message exchange, client-server message exchange, and mesh exchange interactions can be anticipated. In some embodiments, an action exchange pattern can be implemented to construct other exchange patterns and interactions.

Figure 8:
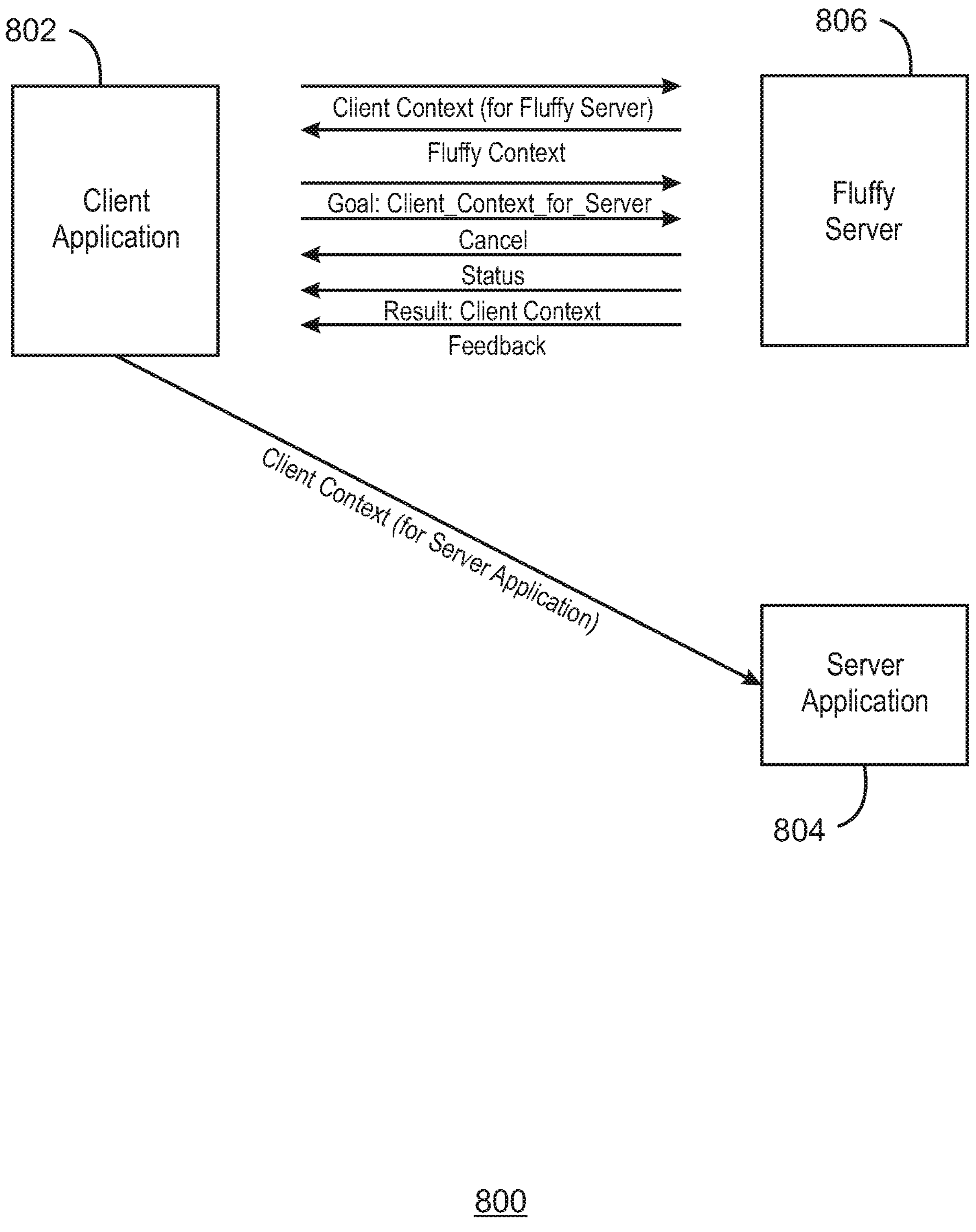
FIG. 8 illustrates a system in accordance with some embodiments.

FIG. 8 illustrates a system 800 (for example, a robot system) in accordance with some embodiments. System 800 can include a fluffy action interaction model in a robot system such as a robot operating system (for example, ROS or ROS2). System 800 can include a client application 802 (for example, a client side application), a server application 804 (for example, a server side application), and a server 806. In some embodiments, client application 802, server application 804, and server 806 can be communicatively connected via wired or wireless connections. In some embodiments, communication pathways between client application 802, server application 804, and server 806 can be used to send messages. In some embodiments, client application 802 can be included in (or run by) any of the nodes illustrated and/or described herein (for example, any of the nodes in FIGS. 1-6), and/or in some embodiments, server application 804 can be included in (or run by) any of the nodes illustrated and/or described herein (for example, any of the nodes in FIGS. 1-6). In some embodiments, client application 802 can be the same as or similar to client application 702, and/or in some embodiments, server application 804 can be the same as or similar to server application 704. In some embodiments, server 806 can be included in any one or more of master 112, master 212, master 312, master 412, master 512, or master 612. In some embodiments, server 806 can be a key exchange server, a fluffy server, and/or any server that can help implement messaging security. In some embodiments, fluffy server 806 can help provide key management exchanges over a network such as, for example, a robot system network.

In some embodiments, system 800 illustrates an approach to implementing key management (for example, key management in a robot system). In some embodiments of system 800, in order to obtain a client context, client application 802 interacts with fluffy server 806 to obtain a client context that it can provide to server application 804. Fluffy server 806 can implement key management flow in order to obtain the client context to be sent from client application 802 to server application 804. In some embodiments, the seven action message flows between client application 702 and server application 704 can be combined into one flow identified by the Client Context line between client application 802 and server application 804.

In some embodiments, FIG. 8 illustrates a fluffy action interaction model between the client application 802 and the fluffy server 806. It is noted that in some embodiments a similar fluffy action interaction model to that between client application 802 and fluffy server 806 can be implemented between server application 804 and fluffy server 806 to obtain a Server Context signal that can then be provided from server application 804 to client application 802 (not illustrated in FIG. 8).

Client application 802 can send to the fluffy server 806 a client context (ClientConext) for the fluffy server 806, a goal message (Goal:Client_Context_for_Server), and a cancel message. Fluffy server 806 can send to client application 802 a fluffy context message (FluffyContext), a status (Status), a client context result (Result: ClientContext), and feedback. Client application 802 can send to the server application 804 a client context (ClientContext) for the server application.

In some embodiments, client application 802 can implement an action pattern that constructs client context (ClientContext) and server context (ServerContext) messages such as those illustrated in and described in reference to FIG. 7. The client context message (ClientContext) can be reused (although it is specific to the fluffy server 806) to protect a set of key management messages (for example, as defined by a fluffy key exchange protocol). The goal message (Goal: Client_Context_for_Server) can identify an objective to obtain a client context message (ClientContext) that is suitable for interactions with the server application 804 by a client application 802. It is noted that each pairing of a client application (for example, such as client application 802) and a server application (for example, such as server application 804) may define a unique context. In some embodiments, for example, multiple client/server applications may exist as nodes in an interaction model involving intra-process, inter-process, and inter-node exchanges. Therefore, in some embodiments, each pairing of client and server applications may have a security context that is specific to that particular client application to server application pairing.

In some embodiments, various security aspects can be integrated into a such as a robot system, an autonomous vehicle system, a distributed system, a robot operating system, a robot middleware interaction system, or other system. For example, in some embodiments, a protected message may be defined, a set of key management actions may be defined, a pre-action contract (PaC) exchange may be used, action server and action client actions may be performed in a TEE, and/or a repository containing a library of action models may be used.

In some embodiments, a protected message (protected message type) may be defined that identifies an object that provides a cryptographic message wrapper around the original message. For example, in some embodiments, the object may be a Concise Binary Object Representation (CBOR) Object Signing and Encryption (COSE) protocol object, as per the Internet Engineering Task Force (IETF) Request for Comments (RFC) 8152. In some embodiments, the protected message may be a 3-tuple message (rather than a 2-tuple message). The 3-tuple message can include a security context identifier (for example, <type>, <name>, <context>). The context (<context>) can refer to a pre-requisite action performed by an action client and/or an action server (for example, performed by action client 724 and/or action server 744) to apply key management and message protection actions before the message is exchanged.

In some embodiments, a set of key management actions is defined that implements fluffy protocols. For example, a set of key management actions may be defined that implements fluffy protocols as discussed for example, by Thomas Hardjono and Ned Smith at Internet Engineering Task Force (IETF) site: https://datatracker.ietf.org/doc/draft-hardjono-ace-fluffy/. The context (<context>) may be executed before the message is exchanged. In some embodiments, the context may be the same for a series of messages used to construct an application action. This can indicate that the same security context is to be applied for each message in the action. However, if a different context is needed, a different context may be used. For example, if traffic in one direction should be protected differently than traffic in the opposite direction, then a different context may be used for messages that flow in different directions.

In some embodiments, a pre-action contract (PaC) exchange may be used that supplies expected action message exchanges (for example, informed by interface definition scripts). In some embodiments, pre-action contracts may be signed by a swimlane service (SLS) that evaluates actions according to a semantic rule engine that determines whether or not the swimlane (for example, communication pathway swimlane or communication connection swimlane) makes sense (for example, from a safety, security, and integrity perspective). In some embodiments, both an action client (for example, action client 724) and an action server (for example, action server 744) verify that the contract matches the action about to be performed.

In some embodiments, action server (for example, action server 744) and action client (for example, action client 724) actions may be performed in a TEE to better ensure reliable evaluation of the contract and secure use of cryptographic keys, for example.

In some embodiments, a repository may be used that contains a library of action models used for code generation and contract evaluation (for example, by a swimlane service) may be used to ensure integrity of action model scripts used by multiple vendors.

In some embodiments, secure type-enforced actions are closely integrated with ROS interaction modeling, code generation and operation in a manner that the semantics of operation can be verified during operation (for example, as a pre-requisite to action message exchange). In some embodiments, key management can be built into the action model itself. This can help ensure end-to-end protection of messages that may cross one or more pub/sub (publication/subscriber) brokers. In some embodiments, the correct keys are used to protect the intended messages. In some embodiments, adjustments to security such as revocations or security policy can be processed dynamically. In some embodiments, key management and type enforcement semantics may be included in interface definition scripts. This can, where appropriate, generate code that implements scalable key management and type-enforcement.

Figure 9:
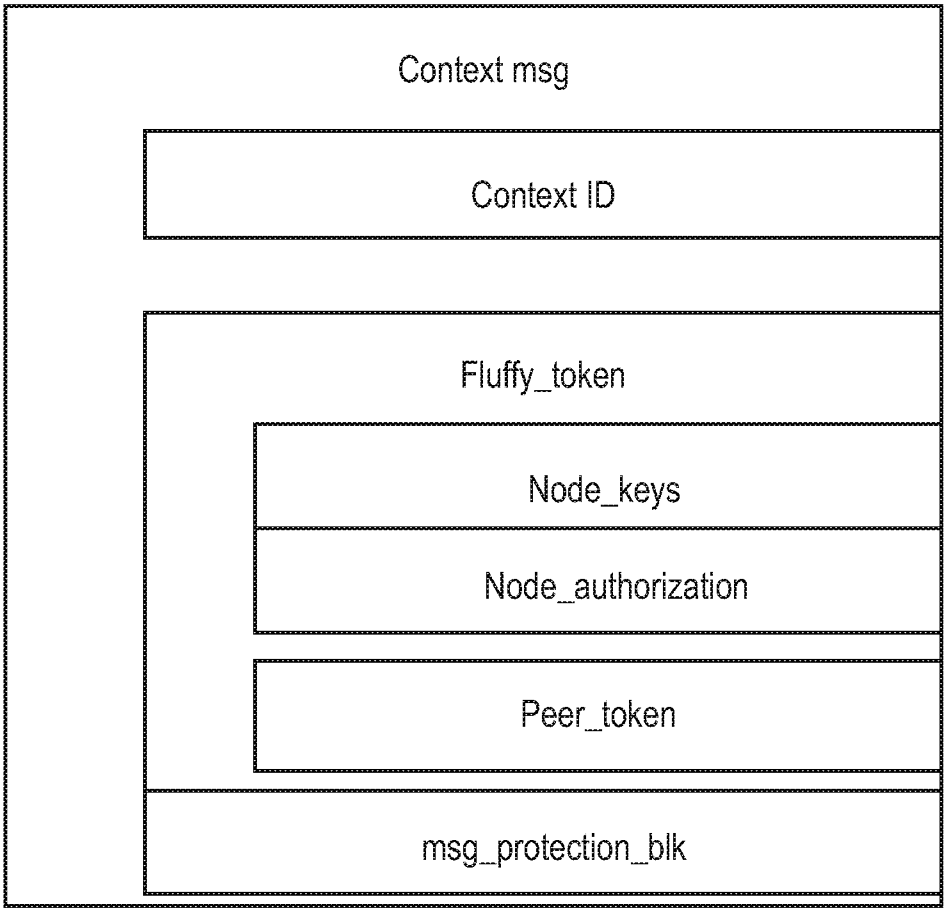
FIG. 9 illustrates a context message in accordance with some embodiments.

FIG. 9 illustrates a context message 900 in accordance with some embodiments. Although context message 900 is an example message, other context messages can be sent in accordance with some embodiments. FIG. 9 shows examples of information that could be included in a context message. Context message 900 can include, for example, an identifier, a token, and a message protection block. Context message 900 (Context msg 900) is an example security context message including a context identifier (Context ID), a fluffy token (or key exchange token) (Fluffy_token), and a message protection block (msg_protection_blk). The message protection block can add cryptographic protection to a set of values rather than merely relying on physical security of the connection.

The fluffy token can include cryptographic keys (for example, Node_keys) and an authorization (Node_authorization) bound to the node requesting the content. The TEE to which the context message 900 is bound may verify, store, and use the keys (Node_keys) and authorization (Node_authorization) as needed to protect messages exchanged between the node and one or more peer nodes, for example. The peer token (Peer_token) may be a token that is bound to the peer TEE (for example, the server application TEE) so that the node and one or more peer nodes may exchange protected messages.

Figure 10:
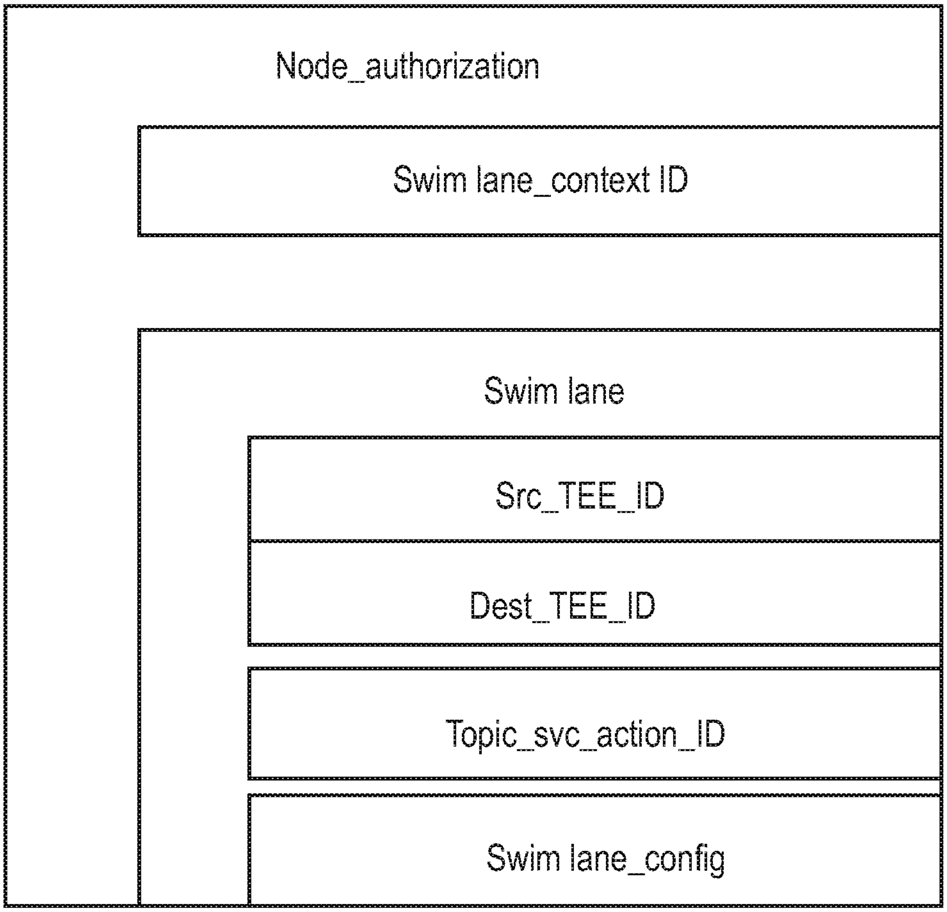
FIG. 10 illustrates a portion of a context message in accordance with some embodiments.

FIG. 10 illustrates a node authorization 1000 in accordance with some embodiments. In some embodiments, node authorization 1000 (Node_authorization) may be the node authorization illustrated in FIG. 9 as part of the context message 900. FIG. 10 adds swimlane context to the node authorization of FIG. 9, for example. The swimlane information in node authorization 1000 can be used, for example, to ensure that the appropriate nodes are securely interacting (for example, securely communicating) without any unapproved nodes being involved (malicious or non-malicious).

Node authorization 1000 identifies a swimlane context (Swimlane_context_ID) where an action message exchange is anticipated. Node authorization 1000 also includes a swimlane (for example, communication pathway swimlanes or communication connection swimlanes) including a source endpoint (Src_TEE_ID) and a destination endpoint (Dest_TEE_ID). A topic, service or action identifier (Topic_svc_action_ID) in the swimlane specifies a type of expected interaction. For example, a status monitoring action specific to a particular robotic function may be identified by its identifier and included as part of the swimlane definition. Node authorization 1000 can also include a swimlane configuration parameter set (Swimlane_config). The swimlane configuration parameter may be used to initialize, construct, or otherwise create action message exchanges occurring within the swimlane context. For example, it may describe construction of a shared memory IPC channel. The swimlane parameters may be enforced by an action client and/or an action server that are protected within a TEE (for example, enforced by action client 722 and/or action server 742). In some embodiments, swimlane configuration and operation may be hardened differently from other action functions, which can achieve safer operation through isolation. For example, in some embodiments, an SGX TEE may perform swimlane operations while application specific action messages are processed by an Intel® Clear Container TEE. Other container technologies that may be used include, for example, Kubernetes, Docker, Open Stack, Kata, etc., among others. A ROS and/or ROS2 image may be regarded as a container application. A container orchestration infrastructure may be applied at a container level, independent from the ROS interaction semantics. In addition, a container orchestration interaction could be augmented or informed by a ROS/ROS2 interaction semantic where the security of the ROS/ROS2 flows and TEE endpoints are used within container enveloping contexts.

Figure 11:
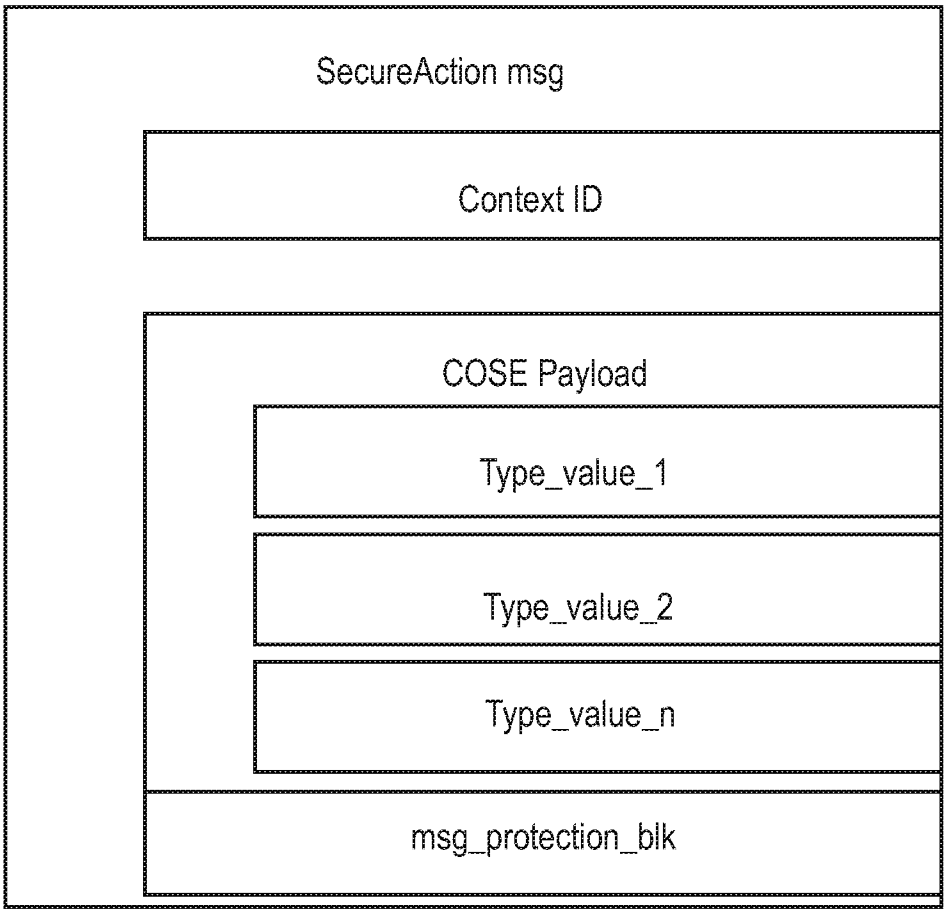
FIG. 11 illustrates an action message in accordance with some embodiments.

FIG. 11 illustrates an action message 1100 in accordance with some embodiments. For example, in some embodiments, action message 1100 can be a secure action message (for example, SecureAction msg). In some embodiments, action message 1100 includes a context identifier (Context ID) and a security payload. The security payload can include, for example, a COSE payload and/or a message protection block (msg_protection_blk). The message protection block can add cryptographic protection to a set of values rather than merely relying on physical security of the connection.

In some embodiments, action message 1100 corresponds to an action interaction with a payload including one or more type-value tuples. The payload can be cryptographically protected using a message encryption technology. For example, in some embodiments, the payload can be cryptographically protected using one or more of: COSE (for example, as per Internet Engineering Task Force Request for Comments 8152, CBOR Object Signing and Encryption or Concise Binary Object Representation Object Signing and Encryption), Object Security for Constrained RESTful Environments (for example, OSCORE as per Internet Engineering Task Force object core security CORE working group), transport layer security (TLS), datagram transport layer security (DTLS), cryptographic message context (for example, CMS as per Internet Engineering Task Force Request for Comments 3852), etc. In some embodiments, action message 1100 includes a context identifier (Context ID) that corresponds to the context identifier (Context ID) of FIG. 9. In some embodiments, for example, action message 1100 includes a structure that specifies a cryptographic and swimlane authorization context that the payload of action message 1100 is protected.

In some embodiments, a fluffy server such as, for example, in some embodiments fluffy server 806 (or other service) performs an offline analysis of action interactions to determine appropriate protection and swimlane configurations, (for example, communication pathway swimlane configurations or communication connection swimlane configurations) and ensures that action client to server interaction semantics are safe. A fluffy token can ensure that an action interaction is appropriate, satisfying security and safety objectives. In some embodiments, a fluffy token may be augmented to include Data Distribution Service (DDS) quality of service (QoS) parameters that further describe expected quality of services settings that should take place when action messages are exchanged. In some embodiments, if the current QoS settings of the node differ from those prescribed within the token, either the client or the server may opt to refuse processing or may dynamically modify quality of service (QoS) settings as needed, for example.

Figure 12:
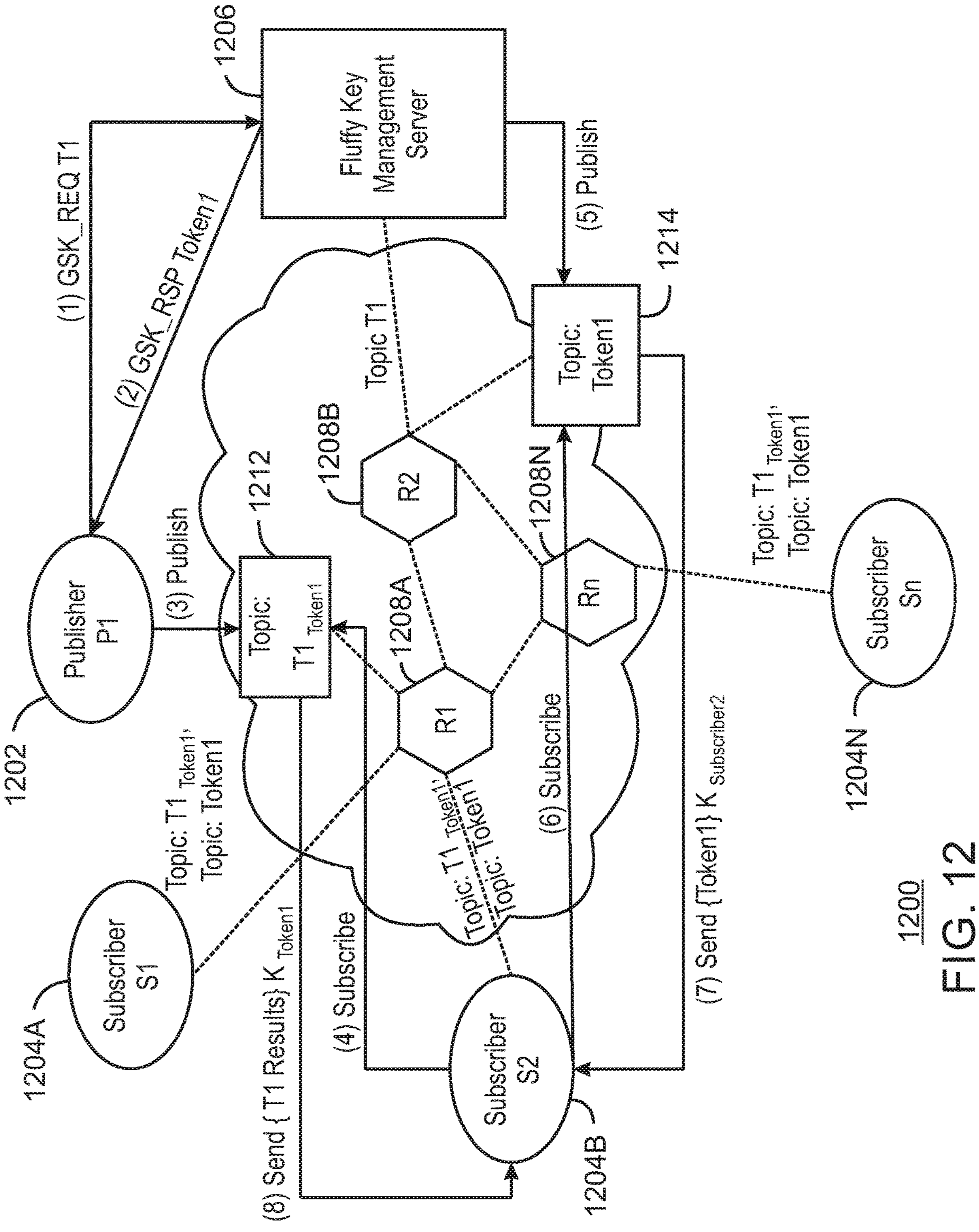
FIG. 12 illustrates a notification system in accordance with some embodiments.

FIG. 12 illustrates a system 1200 (for example, a robot system) in accordance with some embodiments. In some embodiments, system 1200 may include distributed notification (for example, distributed notifications). In some embodiments, system 1200 can implement action interaction (for example, action interaction as illustrated in FIG. 7 and/or FIG. 8). In some embodiments, system 1200 may be (or may be included in) a robot system such as a robot operating system and/or a robot middleware system (for example, ROS or ROS2). In some embodiments, system 1200 includes a publish/subscribe message passing system. In some embodiments, system 1200 may include a publisher (or publisher node) 1202 (Publisher P1), a plurality of subscribers (or subscriber nodes) 1204A, 12048, . . . , 1204N (Subscribers S1, S2, . . . , $S_n$) and a fluffy server (or fluffy key management server) 1206. In some embodiments, publisher P1 1202 may be any one or more of the nodes of any of FIGS. 1-6. Although FIG. 12 illustrates one publisher P1 1202, some embodiments may include any number of publishers, and system 1200 is not limited to systems with only one publisher. In some embodiments, publisher P1 1202 may include (or may run) any of applications 702, 704, 802, or 804. In some embodiments, any one or more of subscribers S1, S2, . . . , Sn (1204A, 12048, . . . , 1204N) may be any one or more of the nodes of any of FIGS. 1-6. In some embodiments, any one or more of subscribers S1, S2, . . . , Sn (1204A, 12048, . . . , 1204N) may include (or may run) any of applications 702, 704, 802, or 804. In some embodiments, server 1206 may be the same as or similar to server 806.

System 1200 may also include notification routers 1208A, 1208B, . . . , 1208N (R1, R2, . . . , Rn) to deliver notification messages. In some embodiments, system 1200 involves distributed notifications, where notification routers 1208A, 1208B, . . . , 1208N deliver notification messages regarding available topics. In some embodiments, a Bloom filter notification system may be used to inform regarding available topics. It is noted that although N routers and N subscribers are illustrated in FIG. 12, system 1200 may include any number of routers and subscribers, and the number of routers and the number of subscribers in the system need not be the same in some embodiments. In some embodiments, elements of system 1200, including, for example, publisher P1 1202, subscribers 1204A, 1204B, . . . , 1204N, routers 1208A, 1208B, . . . , 1208N, server 1206, and topics 1210 and 1212, etc. can be communicatively connected via wired or wireless connections. In some embodiments, communication pathways between nodes and other elements of FIG. 12 can be used to send messages.

In some embodiments, for example, publisher P1 1202 may be as simple as a motor controller, telling one or more subscriber motor to turn on, to turn off, to set it's speed, etc. In this example, a motor might be a subscriber (for example, such as one of subscribers S1, S2, . . . , SN 1204A, 1204B, . . . , 1204N) subscribing to motor messages. In some embodiments, one publisher motor controller may have four subscriber motors controlling four wheels, where each of the four subscriber motors subscribe to the one publisher motor controller (or, for example, to four respective separate publisher motor controllers in some embodiments). In some embodiments, a subscribing logging system that is simply logging what is going on between the motor controller(s) and the motor(s) may subscribe to the motor controller publisher(s). The logging system may, for example, have nothing to do with the control by the publisher(s) that is/are turning on the motor(s), but may provide the data to a display such as a dashboard display, logging it to a file, providing it to a system that can figure out how far the system has moved, etc. Such a logging system could then provide as a publisher the logged data to one or more other subscriber(s) acting as a controller (or controllers) to provide one or more other type of control based on the logged data.

In some embodiments, a content publisher (for example, Publisher P1 1202) prepares content (for example, content T1) for secure group distribution. In some embodiments, publisher P1 1202 can send data out as a topic string, and one or more of subscribers S1, S2, . . . , SN 1204A, 1204B, . . . , 1204N can express interest in topics that are being published. For example, a hierarchical naming scheme may be used for data (for example, data in flight) using the publish/subscribe system. For example, a subscriber might request any topics "A/*" where "*" can be anything, including, for example, topics "A/B", "A/C", "A/D", or any other topic beginning with "A/". The subscriber can then obtain all message topics beginning with "A/". However, whether the subscriber can decrypt all of those topics will depend on the subscriber being provisioned with the corresponding decryption keys, for example. For example, in some embodiments, groups of a publisher and subscribers are handled where the publisher and subscribers do not necessarily know each other (although they may all be known by a key management system). In some embodiments, a key management system can provide approval for one or more subscriber to decrypt messages from one or more publishers. In some embodiments, tokens expire and a key refresh needs to be implemented.

In some embodiments, Publisher P1 1202 provides (1) a group key request (GSK_REQ T1) to key management server 1206 to obtain a group key. In response, key management server 1206 provides (2) a content protection context token (Token1) (GSK_RSP Token1). Then the content T1 is securely published (3), for example, under a topic 1212 (for example, Topic: $T1_{Token1}$). Topic 1212 may be a Topic: $T1_{Token1}$, where Token1 denotes a key context needed to access clear text of the content T1. At this point, all potential subscribers (for example, Subcribers S1 1204A, S2 1204B, . . . , Sn 1204N, etc.) are notified of the availability of the topic 1212 ($T1_{Token1}$).

In an example, Subscriber S2 1204B is interested in topic 1212 ($T1_{Token1}$), so Subscriber S2 1204B subscribes (4) to topic 1212 $T1_{Token1}$. The key management server 1206 observes that the notification for topic 1212 $T1_{Token1}$ is available for the token (Token1) generated at (2) (for example, observes the notification via one or more of routers R1 1208A, R2 1208B, . . . , Rn 1208N), and the key management server 1206 creates (publishes) (5) a topic 1214 (Topic Token1) so that one or more of subscribers 1204A, 12048, . . . , 1204N may obtain Token1. Subscriber S2 1204B recognizes that topic 1212 requires a security context Token1 and responds by subscribing to the topic 1214 (Token1). The key management server 1206 delivers (7) the Token1 security context ($\{Token1\}K_{subscriber2}$) specifically to Subscriber S2 12048. Subscriber S2 1204B receives the encrypted content T1 ($\{T1Results\}K_{Token1}$) sent (8) from Publisher S1 1202, and Subscriber S1 1204B decrypts the received encrypted content using Token1 1214 received from the key management server 1206.

In some embodiments, system 1200 can support multiple subscribers. For example, in some embodiments, system 1200 can support multiple subscribers each having a customized token authorizing access to group content (for example, to group content T1). In some embodiments, one or more subscribers (for example, one or more of subscribers S1, S2, . . . , Sn 1204A, 1204B, . . . , 1204N) may be passive listeners unknown to publisher P1 1202. These passive listener subscribers may be able to consume the content (for example, content T1) according to constraints supplied in a security context (for example, Token1 security context). The security context may be encrypted to the specific recipient (for example, the specific subscriber S1, S2, . . . , Sn 1204A, 1204B, . . . , 1204N), and may have recipient (or subscriber) authorization constraints as defined by a swimlane policy.

In some embodiments, swimlane policies may be richly expressed. For example, one or more swimlane policy may include a list of allowed publisher to subscriber 2-tuples. In some embodiments, one or more swimlane policy may be described as a Bloom filter containing a map of topics that are appropriate for a subscriber to receive. In some embodiments, one or more swimlane policy may be described using a list of content type tags. For example, in some embodiments, one or more swimlane policy may be described using a list of content type tags including one or more content type tags such as one or more of an Extensible Markup Language (XML), JavaScript Object Notation (JSON), Swagger, OpenAPI, or other markup language tags that enumerate content type and/or file type.

In some embodiments, a subscriber and/or a TEE within a subscriber (for example, one or more of subscribers S1, S2, . . . , Sn and or a TEE within one or more of subscribers S1, S2, . . . , Sn) may prevent use of the decryption key (for example, the decryption key in Token1) unless or until the swimlane policy is in place. In some embodiments, the content publisher (for example, publisher P1 1202) may be required (for example, may be required by a TEE within the content publisher) to authenticate content to be published using an authentication challenge, and the response may be included with the content. In some embodiments, the subscriber and/or a TEE within the subscriber (for example, one or more of subscribers S1, S2, . . . , Sn and or a TEE within one or more of subscribers S1, S2, . . . , Sn) may enforce publisher authentication as part of swimlane authorization, but the publisher (for example, publisher P1 1202) may not authenticate each subscriber individually.

In some embodiments, a subscriber (for example, one or more of subscribers S1, S2, . . . , Sn) may be notified of the topic (for example, may be notified of topic 1212), but does not subscribe due to a lack of interest. In some embodiments, the subscriber (for example, one or more of subscribers S1, S2, . . . , Sn) may be interested in the topic (for example, may be notified of topic 1212), but is not permitted to receive the token (for example, is not permitted to receive Token1) necessary to decrypt (for example, necessary to decrypt T1).

In some embodiments, system 1200 can scale according to the underlying notification system. For example, if the system for delivering notifications (for example, system 1200) is distributed using notification routers (for example, notification routers such as routers 1208A, 12088, . . . , 1208N) key management topics can scale with the same efficiency as content topics.

Figure 13:
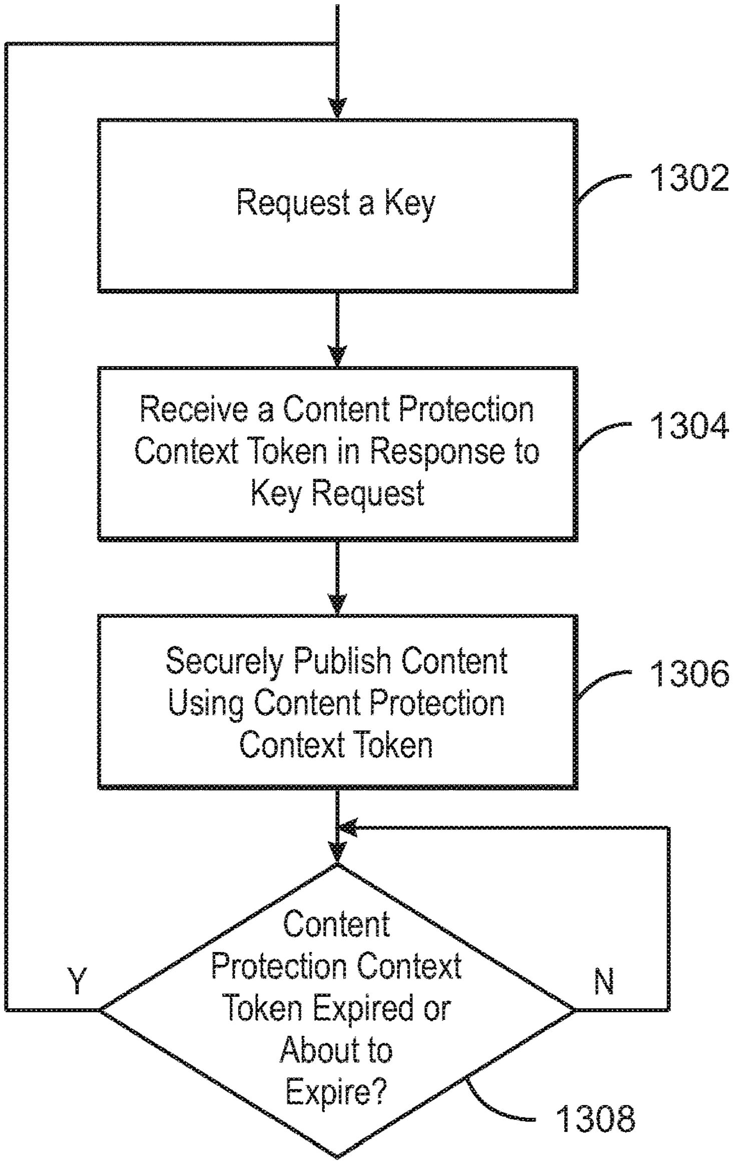
FIG. 13 illustrates a flow diagram in accordance with some embodiments.

FIG. 13 illustrates flow 1300 in accordance with some embodiments. In some embodiments, flow 1300 may be implemented by a publisher (for example, any publisher or node herein such as, for example, node 322, node 522, node 622, publisher P1 1202, etc., or any other node and/or publisher illustrated and/or described herein).

A key (for example, such as a group key) is requested at 1302. In some embodiments, for example, the key is requested from a server (for example, a key management server and/or a fluffy server such as server 806 or server 1206). A content protection context token is received at 1304 in response to the key request (for example, from a server such as a key management server and/or a fluffy server such as server 806 or server 1206). At 1306 content is securely published using the content protection context token. A determination is made at 1308 as to whether the content protection context token has expired (or in some embodiments, whether the content protection context token is about to expire). If the content protection context token has expired (or is about to expire) at 1308, flow returns to 1302 and a new key is requested. If the content protection context token has not expired (or is not about to expire) at 1308, flow remains at 1308 and the content protection context token may be used (for example, by a subscriber) to decrypt encrypted content using the content protection context token.

Figure 14:
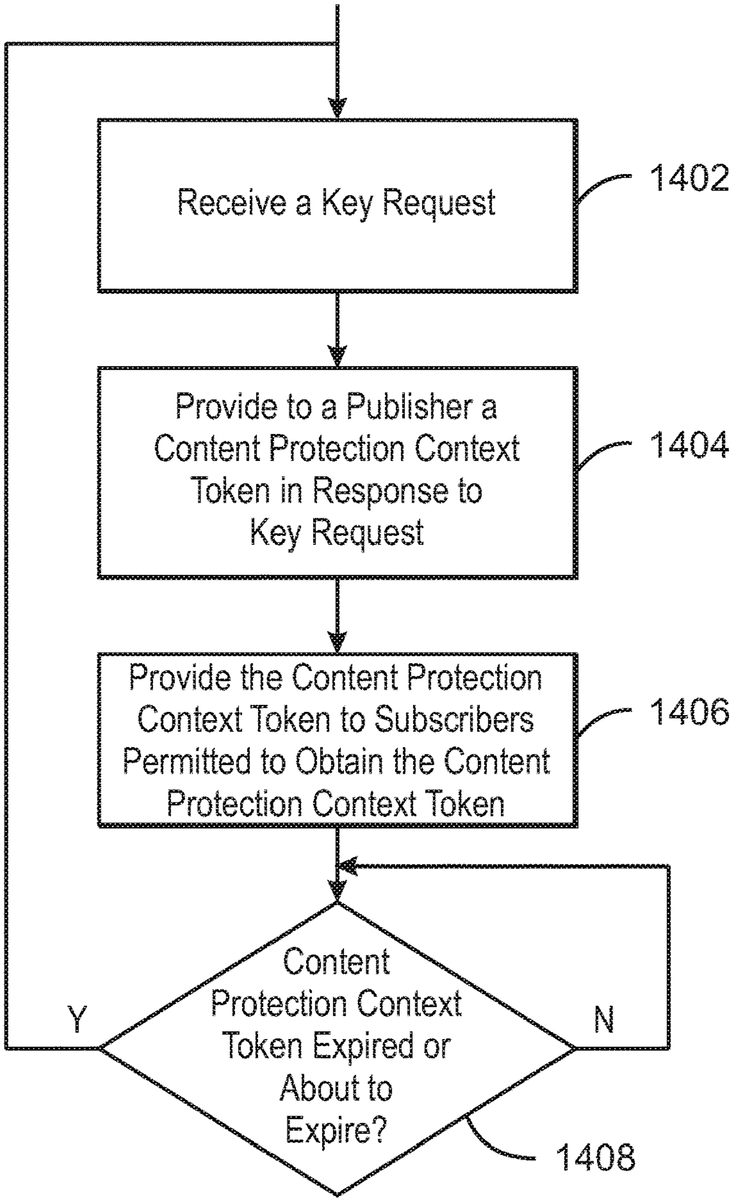
FIG. 14 illustrates a flow diagram in accordance with some embodiments.

FIG. 14 illustrates flow 1400 in accordance with some embodiments. In some embodiments, flow 1400 may be implemented by a server (for example, a key management server and/or a fluffy server, and/or any server herein such as, for example, server 806 or server 1206)

A key request (for example, such as a group key request) is received at 1402. In some embodiments, for example, the key is requested from a publisher (for example, from node 322, node 522, node 622, publisher P1 1202, etc., or any other node and/or publisher illustrated and/or described herein). A content protection context token is provided to the publisher at 1404 in response to the key request. At 1406 the content protection context token is provided to subscribers permitted to obtain the content protection context token (for example, any subscriber or node, such as, for example, node 324, node 542, node 624, and/or one or more of subscribers S1, S2, . . . , Sn 1204A, 12048, . . . , 1204N). A determination is made at 1408 as to whether the content protection context token has expired (or in some embodiments, whether the content protection context token is about to expire). If the content protection context token has expired (or is about to expire) at 1408, flow returns to 1402 and a new key request can be received. If the content protection context token has not expired (or is not about to expire) at 1408, flow remains at 1408 and the content protection context token may be used (for example, by a subscriber) to decrypt encrypted content using the content protection context token.

Figure 15:
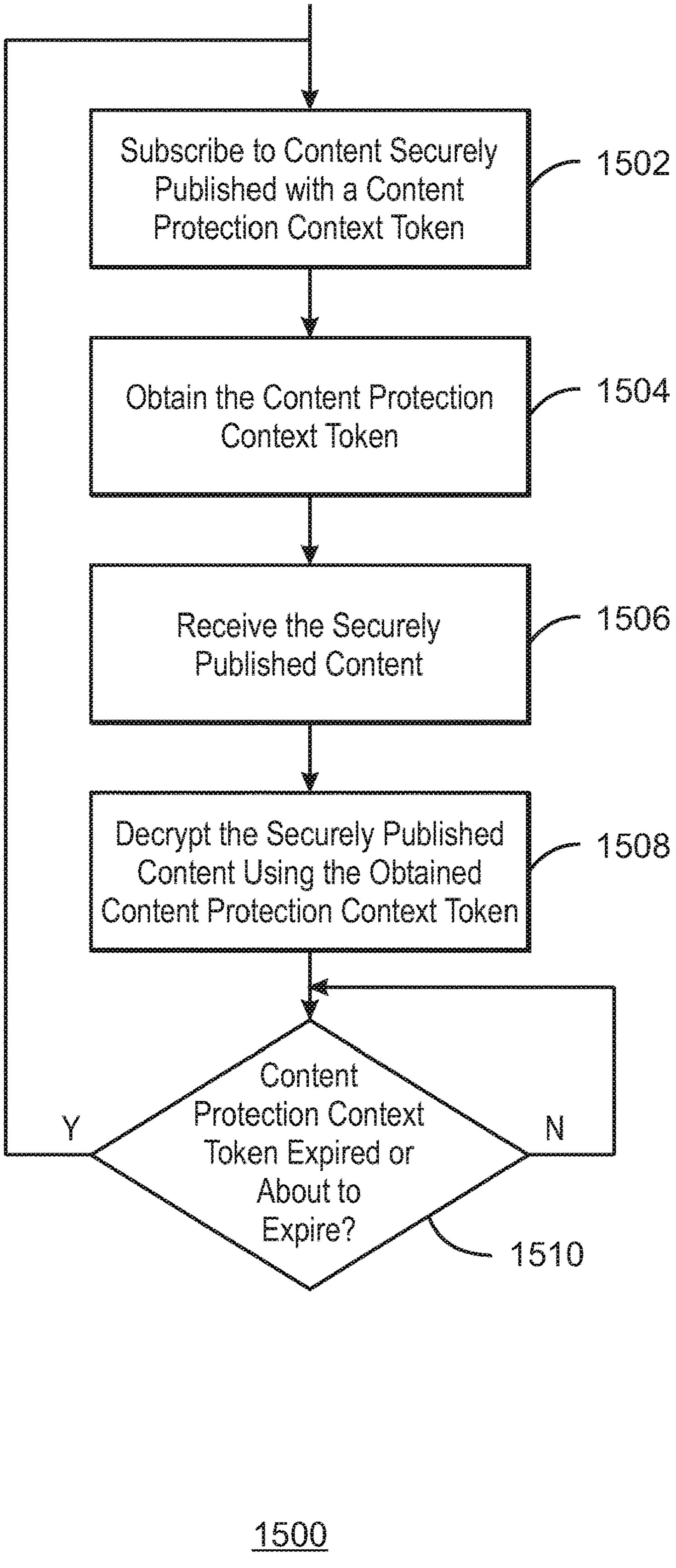
FIG. 15 illustrates a flow diagram in accordance with some embodiments.

FIG. 15 illustrates flow 1500 in accordance with some embodiments. In some embodiments, flow 1500 may be implemented by a subscriber (for example, any subscriber or node herein such as, for example, node 324, node 524, node 542, node 624, subscriber S1 1204A, subscriber S1 1204B, subscriber Sn 1204N, etc., or any other node and/or subscriber illustrated and/or described herein).

Content that has been securely published with a content protection context token is subscribed to at 1502. In some embodiments, for example, the content is subscribed to via a server (for example, a key management server and/or a fluffy server such as server 806 or server 1206). A content protection context token is received at 1504 (for example, from a server such as a key management server and/or a fluffy server such as server 806 or server 1206). The securely published content is received at 1506. At 1508 the securely published content is decrypted using the obtained content protection context token. A determination is made at 1510 as to whether the content protection context token has expired (or in some embodiments, whether the content protection context token is about to expire). If the content protection context token has expired (or is about to expire) at 1510, flow returns to 1502 and a new key is requested. If the content protection context token has not expired (or is not about to expire) at 1510, flow remains at 1510 and the content protection context token may be used by the subscriber to decrypt encrypted content using the content protection context token.

Figure 16:
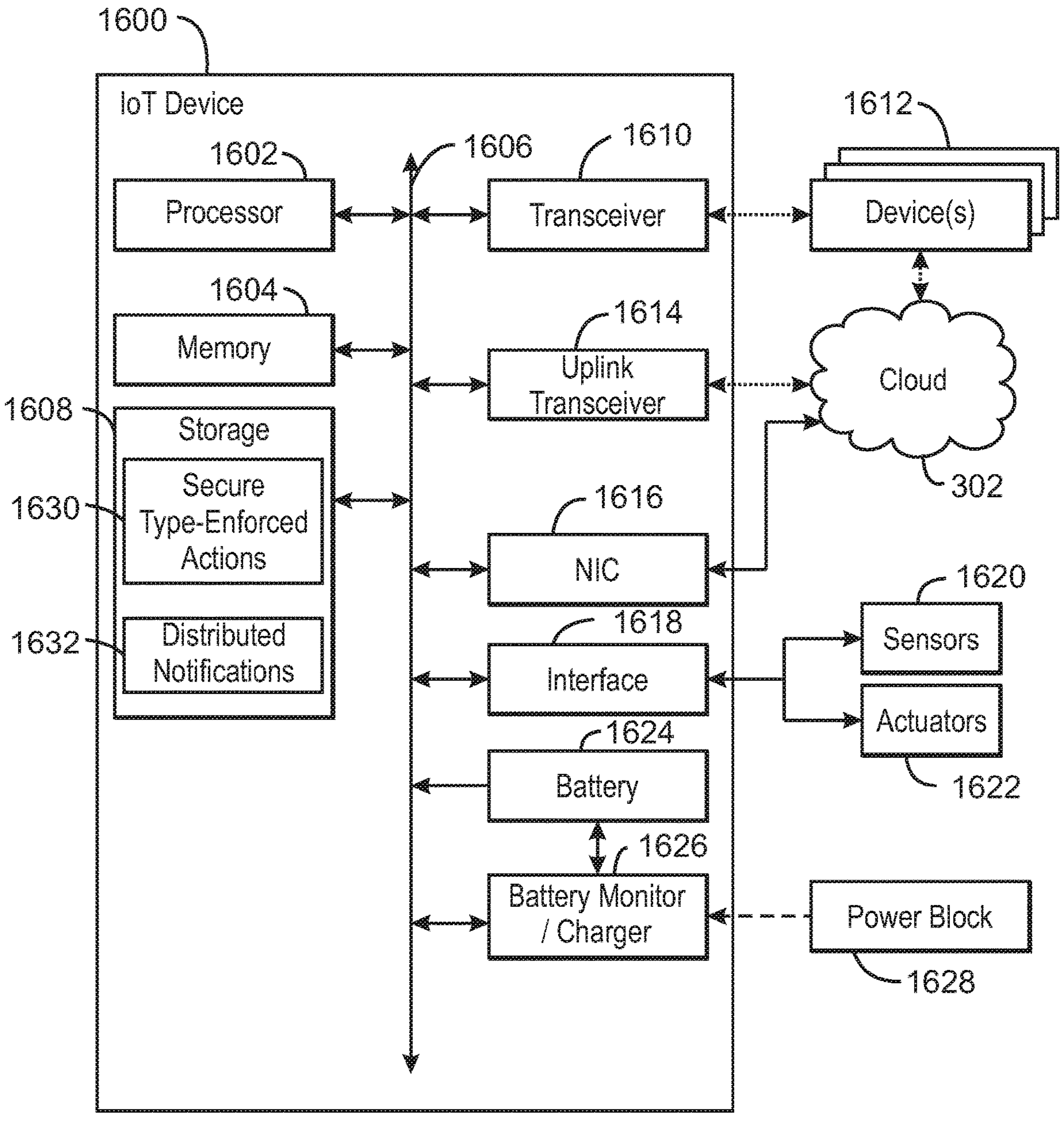
FIG. 16 is a block diagram of an example of components that may be present in one or more computing device in accordance with some embodiments.

FIG. 16 is a block diagram of an example of components that may be present in a computing device 1600 (for example, a computer) for implementing secure type-enforced actions and/or distributed notifications (for example, for implementing secure type-enforced actions and/or distributed notifications in a robot system). In some embodiments, computing device 1600 may implement any of the techniques illustrated or described herein. In some embodiments, for example, computing device 1600 may be (and/or may be included in) one or more nodes such as any of the nodes illustrated or described herein (for example, such as one or more of the nodes illustrated in any of FIGS. 1-6). In some embodiments, for example, computing device 1600 may be (and/or may be included in) one or more master such as any of the masters illustrated or described herein (for example, such as any of the masters illustrated in any of FIGS. 1-6). In some embodiments, for example, computing device 1600 may be (and/or may be included in) one or more of computing devices 402, 404, 502, or 504. In some embodiments, computing device 1600 may include any one or more of client application 702, server application 704, client application 802, server application 804, server 806, publisher P1 1202, Subscriber S1 1204A, Subscriber S2 1204B, . . . , Subscriber Sn 1204N, server 1206, etc. In some embodiments, computing device 1600 may be included in and/or may be all of any of the systems of FIG. 1-8 or 12. In some embodiments, computing device 1600 can implement any of the flows illustrated in FIGS. 13-15, for example.

The computing device 1600 may include any combinations of the components shown in the example. The components may be implemented as ICs, portions thereof, discrete electronic devices, or other modules, logic, hardware, software, firmware, or a combination thereof adapted in the computing device 1600, or as components otherwise incorporated within a chassis of a larger system. The block diagram of FIG. 16 is intended to show a high level view of components of the computing device 1600. However, some of the components shown may be omitted, additional components may be present, and different arrangement of the components shown may occur in other implementations.

The computing device 1600 may include a processor 1602, which may be a microprocessor, a multi-core processor, a multithreaded processor, an ultra-low voltage processor, an embedded processor, or other known processing element. The processor 1602 may be a part of a system on a chip (SoC) in which the processor 1602 and other components are formed into a single integrated circuit, or a single package, such as the Edison™ or Galileo™ SoC boards from Intel. As an example, the processor 1602 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number of other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1602 may communicate with a system memory 1604 over a bus 1606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1608 may also be coupled to the processor 1602 via the bus 1606. To enable a thinner and lighter system design, the mass storage 1608 may be implemented via a solid state drive (SSD). Other devices that may be used for the mass storage 1608 include flash memory cards, such as SD cards, microSD cards, xD picture cards, and the like, and USB flash drives.

In low power implementations, the mass storage 1608 may be on-die memory or registers associated with the processor 1602. However, in some examples, the mass storage 1608 may be implemented using a micro hard disk drive (HDD). Further, any number of new technologies may be used for the mass storage 1608 in addition to, or instead of, the technologies described, such as resistance change memories, phase change memories, holographic memories, or chemical memories, among others. For example, the computing device 1600 may incorporate the 3D XPOINT memories from Intel® and Micron®.

The components may communicate over the bus 1606. The bus 1606 may include any number of technologies, including industry standard architecture (ISA), extended ISA (EISA), peripheral component interconnect (PCI), peripheral component interconnect extended (PCIx), PCI express (PCIe), or any number of other technologies. The bus 1606 may be a proprietary bus, for example, used in an SoC based system. Other bus systems may be included, such as an $I^2C$ interface, $I^3C$ interface, an SPI interface, point to point interfaces, and a power bus, among others.

The bus 1606 may couple the processor 1602 to a transceiver 1610, for communications with other devices 1612. The transceiver 1610 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the devices 1612. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The transceiver 1610 may communicate using multiple standards or radios for communications at different range. For example, the computing device 1600 may communicate with geographically proximate devices, e.g., within about 10 meters, using a local transceiver based on BLE, or another low power radio, to save power. More distant devices 1612, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The transceiver 1610 may be incorporated into an MCU as an address directly accessible by the chip, such as in the Curie® units available from Intel.

An uplink transceiver 1614 may be included to communicate with devices in the cloud 302. The uplink transceiver 1614 may be an LPWA transceiver that follows the IEEE 802.15.4, IEEE 802.15.4g, IEEE 802.15.4e, IEEE 802.15.4k, or NB-IoT standards, among others. The computing device 1600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, Weightless-P from the Weightless Special Interest Group, Random Phase Multiple Access (RPMA®) from Ingenu, and other technologies. Further, other communications techniques, such as time-slotted channel hopping, described in the IEEE 802.15.4e specification may be used.

Any number of other radio communications and protocols may be used in addition to the systems mentioned for the transceiver 1610 and uplink transceiver 1614, as described herein. For example, the radio transceivers 1610 and 1614 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1610 and 1614 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication system, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, “car radio phone”), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay), and the like. In addition to the standards listed above, any number of satellite uplink technologies may be used for the uplink transceiver 1614, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1616 may be included to provide a wired communication to the cloud 302 or to other devices, such as the devices 1612. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1616 may be included to allow connection to a second network, for example, a NIC 1616 providing communications to the cloud over Ethernet, and a second NIC 1616 providing communications to other devices over another type of network.

The bus 1606 may couple the processor 1602 to an interface 1618 that is used to connect external devices. The external devices may include sensors 1620, such as accelerometers, level sensors, flow sensors, temperature sensors, pressure sensors, barometric pressure sensors, and the like. The interface 1618 may be used to connect the computing device 1600 to actuators 1622, such as power switches, valve actuators, an audible sound generator, a visual warning device, and the like.

While not shown, various input/output (I/O) devices may be present within, or connected to, the computing device 1600. For example, a display may be included to show information, such as sensor readings or actuator position. An input device, such as a touch screen or keypad, may be included to accept input.

A battery 1624 may power the computing device 1600, although in examples in which the computing device 1600 is mounted in a fixed location, it may have a power supply coupled to an electrical grid. The battery 1624 may be a lithium ion battery, a metal-air battery, such as a zinc-air battery, an aluminum-air battery, a lithium-air battery, a hybrid super-capacitor, and the like.

A battery monitor/charger 1626 may be included in the computing device 1600 to track the state of charge (SoCh) of the battery 1624. The battery monitor/charger 1626 may be used to monitor other parameters of the battery 1624 to provide failure predictions, such as the state of health (SoH) and the state of function (SoF) of the battery 1624. The battery monitor/charger 1626 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1626 may communicate the information on the battery 1624 to the processor 1602 over the bus 1606. The battery monitor/charger 1626 may also include an analog-to-digital (ADC) convertor that allows the processor 1602 to directly monitor the voltage of the battery 1626 or the current flow from the battery 1624. The battery parameters may be used to determine actions that the computing device 1600 may perform, such as transmission frequency, network operation, sensing frequency, and the like.

A power block 1628, or other power supply coupled to a grid, may be coupled with the battery monitor/charger 1626 to charge the battery 1624. In some examples, the power block 1628 may be replaced with a wireless power receiver to obtain the power wirelessly, for example, through a loop antenna in the computing device 1600. A wireless battery charging circuit, such as an LTC4020 chip from Linear Technologies of Milpitas, Calif., among others, may be included in the battery monitor/charger 1626. The specific charging circuits chosen depend on the size of the battery 1624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1628 may be augmented or replaced with solar panels, a wind generator, a water generator, or other natural power systems.

The mass storage 1608 may include a number of modules to implement one or more of secure type-enforced actions and/or distributed notifications, or any other techniques described herein. Although shown as code blocks in the mass storage 1608, it may be understood that any of the modules may be fully or partially replaced with hardwired circuits, for example, built into an application specific integrated circuit (ASIC). The mass storage 1608 may include secure type-enforced actions 1630 according to some embodiments. Secure type-enforced actions 1630 and/or distributed notifications 1632 can include code to implement any of the techniques described herein. In some embodiments, computing device 1600 can include a system or a subsystem to implement any of the techniques described herein. For example, in some embodiments, computing device 1600 can be or can include a system or subsystem such as any system or subsystem illustrated in any one or more of FIG. 1-8 or 12.

Examples and embodiments of various techniques have been illustrated and described herein as being implemented, for example, using a processor executing stored instructions. However, it is noted that other examples and embodiments of any of these techniques can includes other implementations. For example, any of the techniques illustrated or described herein can be implemented in any of hardware, software, firmware, or in any combination thereof. Some embodiments can be implemented, for example, using an Application Specific Integrated Circuit (ASIC) or a Field Programmable Gate Array (FPGA), among others.

Figure 17:
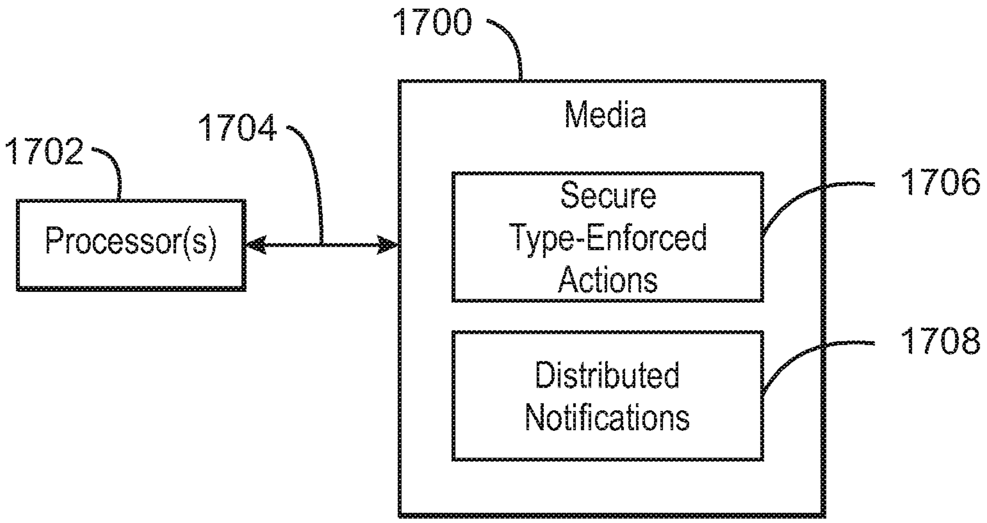
FIG. 17 is a block diagram of a medium or media such as one or more non-transitory, machine readable medium including code (for example, instructions) to direct a processor to implement secure type-enforced actions and/or distributed notifications in accordance with some embodiments.

FIG. 17 is a block diagram of an exemplary non-transitory, media/medium 1700 (for example, one or more computer readable medium 1700 or one or more machine readable medium 1700) including code (for example, computer readable instructions or machine readable instructions) to direct one or more processor 1702 to implement secure type-enforced actions and/or distributed notifications in accordance with some embodiments. The processor(s) 1702 may access the non-transitory, machine readable medium 1700 over a bus 1704. The processor(s) 1702 and bus 1704 may be selected as described with respect to the processor 1602 and bus 1606 of FIG. 16. The medium 1700 or media 1700 may include one or more devices described for the mass storage 1608 of FIG. 16 or may include optical disks, thumb drives, or any number of other hardware devices.

The media or medium 1700 may include code (for example, instructions) to direct the processor(s) 1702 to implement one or more of secure type-enforced actions and/or distributed notifications, or any other techniques described herein. For example, in some embodiments, the media or medium 1700 may include code (for example, instructions) 1706 to direct the processor(s) 1702 to implement secure type-enforced actions. In some embodiments, the media or medium 1700 may include code (for example, instructions) 1708 to direct the processor(s) 1702 to implement distributed notifications.

The techniques described herein may be used to implement any number of systems or networks for various purposes. Additional applications may be implemented.

Example 1 includes a robot middleware system. The system includes a first robot middleware node, a second robot middleware node, and one or more secure encrypted type-enforced context message to communicate between the first robot middleware node and the second robot middleware node.

Example 2 includes the subject matter of example 1. In example 2, the first robot middleware node is a publisher node and the second robot middleware node is a subscriber node.

Example 3 includes the subject matter of any of examples 1-2. In example 3, a key management server is to provide key management between the first robot middleware node and the second robot middleware node.

Example 4 includes the subject matter of any of examples 1-3. In example 4, the first robot middleware node includes a server application and the second robot middleware node includes a client application.

Example 5 includes the subject matter of any of examples 1-4. In example 5, a trusted execution environment is at the first robot middleware node and a trusted execution environment is at the second robot middleware node.

Example 6 includes the subject matter of any of examples 1-5. In example 6, the one or more secure encrypted type-enforced context message includes a context identifier, a token, and a message protection block.

Example 7 includes the subject matter of any of examples 1-6. In example 7, the token includes one or more node keys, node authorization, and a peer token.

Example 8 includes the subject matter of any of examples 1-7. In example 8, the node authorization includes a swimlane context identifier and a swimlane.

Example 9 includes the subject matter of any of examples 1-8. In example 9, the swimlane includes a source endpoint, a destination endpoint, a topic service identifier, and a swimlane configuration.

Example 10 includes the subject matter of any of examples 1-9. In example 10, the one or more secure encrypted type-enforced context message includes a context identifier, a Concise Binary Object Representation (CBOR) Object Signing and Encryption (COSE) protocol payload, and a message protection block.

Example 11 includes the subject matter of any of examples 1-10. In example 11, the one or more secure encrypted type-enforced context message includes an object that provides a cryptographic message wrapper around an original message.

Example 12 includes the subject matter of any of examples 1-11. In example 12, the first robot middleware node is a publisher node, the first robot middleware node to request a key from the key management server, to receive a content protection context token from the key management server in response to the key request, and to securely publish content using the content protection context token.

Example 13 includes the subject matter of any of examples 1-12. In example 13, the second robot middleware node is a subscriber node, the second robot middleware node to subscribe to content securely published with a content protection context token, to obtain the content protection context token from the key management server, to receive the securely published content, and to decrypt the securely published content using the obtained content protection context key.

Example 14 includes the subject matter of any of examples 1-13. In example 14, the key management server is to receive a key request from the first robot middleware node, to provide to the first robot middleware node a content protection context token in response to the key request, and to provide the content protection context token to one or more subscribers permitted to obtain the content protection context token, the one or more subscribers permitted to obtain the content protection context token including the second robot middleware node.

Example 15 includes a non-transitory computer readable medium for a robot middleware system, including instructions that, when executed, direct a processor to provide one or more secure encrypted type-enforced context message to communicate between a first robot middleware node and a second robot middleware node.

Example 16 includes the subject matter of example 15. In example 16, the first robot middleware node is a publisher node and the second robot middleware node is a subscriber node.

Example 17 includes the subject matter of any of examples 15-16. In example 17, the medium includes instructions that, when executed, direct a processor to provide key management between the first robot middleware node and the second robot middleware node.

Example 18 includes the subject matter of any of examples 15-17. In example 18, the first robot middleware node includes a server application and the second robot middleware node includes a client application.

Example 19 includes the subject matter of any of examples 15-18. In example 19, the medium include instructions that, when executed, direct a processor to provide a trusted execution environment at the first robot middleware node and to provide a trusted execution environment at the second robot middleware node.

Example 20 includes the subject matter of any of examples 15-19. In example 20, the one or more secure encrypted type-enforced context message includes a context identifier, a token, and a message protection block.

Example 21 includes the subject matter of any of examples 15-20. In example 21, the token includes one or more node keys, node authorization, and a peer token.

Example 22 includes the subject matter of any of examples 15-21. In example 22, the node authorization includes a swimlane context identifier and a swimlane.

Example 23 includes the subject matter of any of examples 15-22. In example 23, the swimlane includes a source endpoint, a destination endpoint, a topic service identifier, and a swimlane configuration.

Example 24 includes the subject matter of any of examples 15-23. In example 24, the one or more secure encrypted type-enforced context message includes a context identifier, a Concise Binary Object Representation (CBOR) Object Signing and Encryption (COSE) protocol payload, and a message protection block.

Example 25 includes the subject matter of any of examples 15-24. In example 25, the one or more secure encrypted type-enforced context message includes an object that provides a cryptographic message wrapper around an original message.

Example 26 includes the subject matter of any of examples 15-25. In example 26, the first robot middleware node is a publisher node, and the medium includes instructions that, when executed, direct a processor to:

request at the first middleware robot node a key from the key management server, receive a content protection context token from the key management server in response to the key request, and securely publish content using the content protection context token.

Example 27 includes the subject matter of any of examples 15-26. In example 27, the second robot middleware node is a subscriber node, and the medium includes instructions that, when executed, direct a processor to:

subscribe at the second robot middleware node to content securely published with a content protection context token, obtain the content protection context token from the key management server, receive the securely published content, and decrypt the securely published content using the obtained content protection context key.

Example 28 includes the subject matter of any of examples 15-27. In example 28, the medium includes instructions that, when executed, direct a processor to:

receive a key request from the first robot middleware node, provide to the first robot middleware node a content protection context token in response to the key request, and provide the content protection context token to one or more subscribers permitted to obtain the content protection context token, the one or more subscribers permitted to obtain the content protection context token including the second robot middleware node.

Example 29 includes a method for a robot middleware system, including providing a first robot middleware node, providing a second robot middleware node, and sending one or more secure encrypted type-enforced context message between the first robot middleware node and the second robot middleware node.

Example 30 includes the subject matter of example 29. In example 30, the method includes:

providing key management between the first robot middleware node and the second robot middleware node.

Example 31 includes the subject matter of any of examples 29-30. In example 31, the one or more secure encrypted type-enforced context message includes an object that provides a cryptographic message wrapper around an original message.

Example 32 includes the subject matter of any of examples 29-31. In example 32, the method includes:

requesting at the first middleware robot node a key from a key management server, receiving a content protection context token from the key management server in response to the key request, and securely publishing content using the content protection context token.

Example 33 includes a robot middleware system. The system includes a first robot middleware node means, a second robot middleware node means, and one or more secure encrypted type-enforced context message means for communicating between the first robot middleware node and the second robot middleware node.

Example 34 includes the subject matter of example 33. In example 34, the first robot middleware node means is a publisher node means and the second robot middleware node means is a subscriber node means.

Example 35 includes the subject matter of any of examples 33-34. Example 35 includes a key management means for providing key management between the first robot middleware node and the second robot middleware node.

Example 36 includes the subject matter of any of examples 33-35. In example 36, the first robot middleware node means includes a server application means and the second robot middleware node includes a client application means.

Example 37 includes the subject matter of any of examples 33-36. In example 37, a trusted execution environment means is at the first robot middleware node means and a trusted execution environment means is at the second robot middleware node means.

Example 38 includes the subject matter of any of examples 33-37. In example 38, the one or more secure encrypted type-enforced context message means includes a context identifier means, a token means, and a message protection block means.

Example 39 includes the subject matter of any of examples 33-38. In example 39, the token means includes one or more node key means, node authorization means, and peer token means.

Example 40 includes the subject matter of any of examples 33-39. In example 40, the node authorization means includes a swimlane context identifier means and a swimlane means.

Example 41 includes the subject matter of any of examples 33-40. In example 41, the swimlane means includes a source endpoint means, a destination endpoint means, a topic service identifier means, and a swimlane configuration means.

Example 42 includes the subject matter of any of examples 33-41. In example 42, the one or more secure encrypted type-enforced context message means includes a context identifier means, a Concise Binary Object Representation (CBOR) Object Signing and Encryption (COSE) protocol payload means, and a message protection block means.

Example 43 includes the subject matter of any of examples 33-42. In example 43, the one or more secure encrypted type-enforced context message means includes a means for providing a cryptographic message wrapper around an original message.

Example 44 includes the subject matter of any of examples 33-43. In example 44, the first robot middleware node means is a publisher node means, the first robot middleware node means including means for requesting a key from the key management means, means for receiving a content protection context token from the key management means in response to the key request, and means for securely publishing content using the content protection context token means.

Example 45 includes the subject matter of any of examples 33-43. In example 45, the second robot middleware node means is a subscriber node means, the second robot middleware node means including means for subscribing to content securely published with a content protection context token, means for obtaining the content protection context token from the key management server, means for receiving the securely published content, and means for decrypting the securely published content using the obtained content protection context key.

Example 46 includes the subject matter of any of examples 33-45. In example 46, the key management means includes means for receiving a key request from the first robot middleware node, means for providing to the first robot middleware node a content protection context token in response to the key request, and means for providing the content protection context token to one or more subscribers permitted to obtain the content protection context token, the one or more subscribers permitted to obtain the content protection context token including the second robot middleware node means.

Example 47 includes an apparatus including means to perform a method as in any other example.

Example 48 includes machine-readable storage including machine-readable instructions, when executed, to implement a method or realize an apparatus as in any other example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A middleware system comprising:

a first middleware node;

a second middleware node; and a communication management system configured to send and receive at least one secure encrypted type-enforced context message used to communicate between the first middleware node and the second middleware node, wherein the at least one secure encrypted type-enforced context message comprises a protected message that requires a security context, wherein the security context comprises at least one pre-requisite action to be performed by the first and second middleware nodes before the at least one secure encrypted type-enforced context message is communicated by the communication management system between the first middleware node and the second middleware node, wherein the pre-requisite action to be performed by the first middleware node and the second middleware node includes verifying a pre-action contract, the pre-action contract signed by a service indicating that the pre-action contract is valid, and wherein the pre-action contract enumerates respective actions to be taken by the first middleware node and the second middleware node, wherein the security context is established within the middleware system before the at least one secure encrypted type-enforced context, message is exchanged between the first middleware node and the second middleware node, based on security and integrity properties available at each side of the exchange, and wherein in response to an identification that traffic in one direction should be protected differently than traffic in a different direction, a different security context is established within the middleware system for messages that flow in the different direction than a security context used for messages that flow in the one direction.

2. The middleware system of claim 1, wherein the first middleware node is a publisher node and the second middleware node is a subscriber node.

3. The middleware system of claim 1, further comprising a key management server to provide key management between the first middleware node and the second middleware node.

4. The middleware system of claim 3, wherein the first middleware node is a publisher node, the first middleware node to request a key from the key management server, to receive a content protection context token from the key management server in response to the key request, and to securely publish content using the content protection context token.

5. The middleware system of claim 3, wherein the second middleware node is a subscriber node, the second middleware node to subscribe to content securely published with a content protection context token, to obtain the content protection context token from the key management server, to receive the securely published content, and to decrypt the securely published content using the obtained content protection context key.

6. The middleware system of claim 3, wherein the key management server is to receive a key request from the first middleware node, to provide to the first middleware node a content protection context token in response to the key request, and to provide the content protection context token to one or more subscribers permitted to obtain the content protection context token, the one or more subscribers permitted to obtain the content protection context token including the second middleware node.

7. The middleware system of claim 1, wherein the first middleware node includes a server application and the second middleware node includes a client application.

8. The middleware system of claim 1, comprising a trusted execution environment at the first middleware node and a trusted execution environment at the second middleware node.

9. The middleware system of claim 1, wherein the at least one secure encrypted type-enforced context message includes a context identifier, a token, and a message protection block.

10. The middleware system of claim 9, wherein the token includes one or more node keys, node authorization, and a peer token.

11. The middleware system of claim 10, wherein the node authorization includes a swimlane context identifier and a swimlane.

12. The middleware system of claim 11, wherein the swimlane includes a source endpoint, a destination endpoint, a topic service identifier, and a swimlane configuration.

13. The middleware system of claim 1, wherein the at least one secure encrypted type-enforced context message includes a context identifier, a Concise Binary Object Representation (CBOR) Object Signing and Encryption (COSE) protocol payload, and a message protection block.

14. The middleware system of claim 1, wherein the at least one secure encrypted type-enforced context message includes an object that provides a cryptographic message wrapper around an original message.

15. The middleware system of claim 1, wherein the first and second middleware nodes are provided from among: robots, autonomous vehicles, or distributed computing systems.

16. A non-transitory computer readable medium for operation of a middleware system, comprising instructions that, when executed, direct a processor to:

provide, from a communication management system, at least one secure encrypted type-enforced context, message used to communicate between a first middleware node and a second middleware node, wherein the at least one secure encrypted type-enforced context message comprises a protected message that requires a security context; and establish the security context, wherein the security context comprises at least one pre-requisite action to be performed by the first and second middleware nodes before the at least one secure encrypted type-enforced context message is communicated by the communication management system between the first middleware node and the second middleware node, wherein the pre-requisite action to be performed by the first middleware node and the second middleware node includes verifying a pre-action contract, the pre-action contract signed by a service indicating that the pre-action contract is valid, and wherein the pre-action contract enumerates respective actions to be taken by the first middleware nettle and the second middleware node;

wherein the security context is established within the middleware system before the at least one secure encrypted type-enforced context message is exchanged between the first middleware node and the second middleware node, based on security and integrity properties available at each side of the exchange; and wherein in response to an identification that traffic in one direction should be protected differently than traffic in a different direction, a different security context is established within the middleware system for messages that flow in the different direction than a security context used for messages that flow in the one direction.

17. The non-transitory computer readable medium of claim 16, wherein the first middleware node is a publisher node and the second middleware node is a subscriber node.

18. The non-transitory computer readable medium for a middleware system of claim 16, comprising instructions that, when executed, direct a processor to provide a key management server for key management between the first middleware node and the second middleware node.

19. The non-transitory computer readable medium for a middleware system of claim 18, wherein the first middleware node is a publisher node, comprising instructions that, when executed, direct, a processor to:

request at the first middleware node a key from the key management server;

receive a content protection context token from the key management server in response to the key request; and securely publish content using the content protection context token.

20. The non-transitory computer readable medium for a middleware system of claim 18, wherein the second middleware node is a subscriber node, comprising instructions that, when executed, direct a processor to:

subscribe at the second middleware node to content securely published with a content protection context token;

obtain the content protection context token from the key management server;

receive the securely published content; and decrypt the securely published content using the obtained content protection context key.

21. The non-transitory computer readable medium for a middleware system of claim 18, comprising instructions that, when executed, direct a processor to:

receive a key request from the first middleware node;

provide to the first middleware node a content protection context token in response to the key request; and provide the content protection context token to one or more subscribers permitted to obtain the content protection context token, the one or more subscribers permitted to obtain the content protection context token including the second middleware node.

22. The non-transitory computer readable medium for a middleware system of claim 16, wherein the first middleware node includes a server application and the second middleware node includes a client application.

23. The non-transitory computer readable medium for a middleware system of claim 16, comprising instructions that, when executed, direct a processor to provide a trusted execution environment at the first middleware node and to provide a trusted execution environment at the second middleware node.

24. The non-transitory computer readable medium for a middleware system of claim 16, wherein the at least one secure encrypted type-enforced context message includes a context identifier, a token, and a message protection block.

25. The non-transitory computer readable medium for a middleware system of claim 24, wherein the token includes one or more node keys, node authorization, and a peer token.

26. The non-transitory computer readable medium for a middleware system of claim 25, wherein the node authorization includes a swimlane context identifier and a swimlane.

27. The non-transitory computer readable medium for a middleware system of claim 26, wherein the swimlane includes a source endpoint, a destination endpoint, a topic service identifier, and a swimlane configuration.

28. The non-transitory computer readable medium for a middleware system of claim 16, wherein the at least one secure encrypted type-enforced context message includes a context identifier, a Concise Binary Object Representation (CBOR) Object Signing and Encryption (COSE) protocol payload, and a message protection block.

29. The non-transitory computer readable medium for a middleware system of claim 16, wherein the at least one secure encrypted type-enforced context message includes an object that provides a cryptographic message wrapper around an original message.

30. A method for a middleware system, comprising:

provide a first middleware node;

provide a second middleware node; and receiving and sending, from a communication management system, at least one secure encrypted type-enforced context, message used to communicate between the first middleware node and the second middleware node, wherein the at least one secure encrypted type-enforced context message comprises a protected message requires adds a security context; and establish the security context, wherein the security context comprises at least one pre-requisite action to be performed by the first and second middleware nodes before the at least one secure encrypted type-enforced context message is communicated by the communication management system between the first middleware node and the second middleware node, wherein the pre-requisite action to be performed by the first middleware node and the second middleware node includes verifying a pre-action contract, the pre-action contract signed by a service indicating that the pre-action contract, is valid, and wherein the pre-action contract enumerates respective actions to be taken by the first middleware node and the second middleware node;

wherein the security context is established within the middleware system before the at least one secure encrypted type-enforced context message is exchanged between the first middleware node and the second middleware node, based on security and integrity properties available at each side of the exchange; and wherein in response to an identification that traffic in one direction should be protected differently than traffic in a different direction, a different security context is established within the middleware system for messages that flow in the different direction than a security context used for messages that flow in the one direction.

31. The method for a middleware system of claim 30, comprising:

providing key management between the first middleware node and the second middleware node.

32. The method for a middleware system of claim 30, wherein the least one secure encrypted type-enforced context message includes an object that provides a cryptographic message wrapper around an original message.

33. The method for a middleware system of claim 30, comprising:

requesting at the first middleware node a key from a key management server;

receiving a content protection context token from the key management server in response to the key request; and securely publishing content using the content protection context token.

34. The method for a middleware system of claim 30, wherein the first and second middleware nodes are provided from among: robots, autonomous vehicles, or distributed computing systems.

* * * * *

UNITED STATES PATENT AND TRADEMARK OFFICE

CERTIFICATE OF CORRECTION

PATENT NO. : 11,171,940 B2
APPLICATION NO. : 15/942402
DATED : November 9, 2021
INVENTOR(S) : Smith et al.

It is certified that error appears in the above-identified patent and that said Letters Patent is hereby corrected as shown below:

In the Claims

In Column 30, Line 9, in Claim 1, delete “context,” and insert --context-- therefor In Column 31, Line 24, in Claim 16, delete “context,” and insert --context-- therefor In Column 31, Line 43, in Claim 16, delete “nettle” and insert --node-- therefor In Column 32, Line 2, in Claim 19, delete “direct,” and insert --direct-- therefor In Column 33, Line 6, in Claim 30, delete “context,” and insert --context-- therefor In Column 33, Line 23, in Claim 30, delete “contract,” and insert --contract-- therefor In Column 34, Line 15, in Claim 32, after “the”, insert --at--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*